US012552175B2

(12) United States Patent
Kawakita et al.

(10) Patent No.: US 12,552,175 B2
(45) Date of Patent: Feb. 17, 2026

(54) LIQUID SUPPLY SYSTEM, CONTROL METHOD, NON-TRANSITORY COMPUTER-READABLE MEDIUM STORING COMPUTER-READABLE INSTRUCTIONS, AND LIQUID SUPPLY DEVICE

(71) Applicant: BROTHER KOGYO KABUSHIKI KAISHA, Nagoya (JP)

(72) Inventors: Akihiro Kawakita, Nagoya (JP); Hisaaki Yoshimoto, Nukata (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 162 days.

(21) Appl. No.: 18/521,362

(22) Filed: Nov. 28, 2023

(65) Prior Publication Data

US 2024/0173991 A1 May 30, 2024

(51) Int. Cl.
*B41J 2/175* (2006.01)
*B41J 2/18* (2006.01)

(52) U.S. Cl.
CPC ........... *B41J 2/17566* (2013.01); *B41J 2/175* (2013.01); *B41J 2/17523* (2013.01); *B41J 2/17596* (2013.01); *B41J 2/18* (2013.01)

(58) Field of Classification Search
CPC .... B41J 2/17566; B41J 2/175; B41J 2/17523; B41J 2/17596; B41J 2/18; B41J 2/17509; B41J 29/38
See application file for complete search history.

(56) References Cited

U.S. PATENT DOCUMENTS

2024/0173992 A1 * 5/2024 Kawakita ............ B41J 2/17509

FOREIGN PATENT DOCUMENTS

JP 2004314392 A 11/2004

* cited by examiner

*Primary Examiner* — Justin Seo
(74) *Attorney, Agent, or Firm* — K&L Gates LLP

(57) ABSTRACT

A processor of a liquid supply system performs circulation processing based on a circulation setting relating to a unit increase amount that is an amount by which a remaining amount of a liquid in a server or printer tank increases as a result of second circulation processing, per unit time from an end of first circulation processing to an end of the second circulation processing. The processor changes the circulation setting from a first setting to a second setting based on information relating to consumption of the liquid inside the server or printer tank in a predetermined time period. A specific tank is a tank in which the remaining amount increases when the circulation processing is performed based on the first setting. The unit increase amount of the specific tank in the second setting is less than the unit increase amount of the specific tank in the first setting.

10 Claims, 7 Drawing Sheets

LIQUID SUPPLY SYSTEM, CONTROL METHOD, NON-TRANSITORY COMPUTER-READABLE MEDIUM STORING COMPUTER-READABLE INSTRUCTIONS, AND LIQUID SUPPLY DEVICE

REFERENCE TO RELATED APPLICATIONS

This application claims priority from Japanese Patent Application No. 2022-191856 filed on Nov. 30, 2022. The entire content of the priority application is incorporated herein by reference.

BACKGROUND ART

A liquid supply system that supplies a liquid to a printer is known. The liquid supply system is provided with a main tank and the printer. Ink is stored in the main tank as one type of the liquid. The printer is provided with a sub tank. The sub tank is connected to the main tank via a main tank tube. The liquid supply system supplies the ink from the main tank to the sub tank via the main tank tube.

DESCRIPTION

In the above-described liquid supply system, in order to cause a state of the ink, such as a temperature distribution, a density distribution and the like, to be uniform, it is conceivable to circulate the ink between the main tank and the sub tank via the main tank tube. In this case, there is a possibility that an amount of the ink in the main tank after the circulation changes from an amount of the ink in the main tank before the circulation, and an amount of the ink in the sub tank after the circulation changes from an amount of the ink in the sub tank before the circulation. Thus, if the amount of ink in the main tank continues to increase as a result of the circulation being repeatedly performed, there is a possibility that ink may overflow from the main tank. If the amount of ink in the sub tank continues to increase as a result of the circulation being repeatedly performed, there is a possibility that the ink may overflow from the sub tank.

Embodiments of the broad principles derived herein provide a liquid supply system, a control method, a non-transitory computer-readable medium storing computer-readable instructions, and a liquid supply device that contribute to suppressing a liquid from overflowing from a tank in a given time period.

A first aspect of the present disclosure relates to a liquid supply system supplying a liquid to a printer tank. The printer tank is a tank provided in a printer. The liquid supply system includes a tube, a liquid delivery mechanism, a processor, and a memory. The tube connects the printer tank and a server tank configured to store the liquid. The liquid delivery mechanism is provided in the tube, and is configured to perform a supply operation of supplying the liquid from the server tank to the printer tank via the tube, and a return operation of returning the liquid from the printer tank to the server tank via the tube. The memory storing computer-readable instructions that, when executed by the processor, cause the processor to perform processes. The processes include circulation processing of causing the liquid delivery mechanism to perform the supply operation and the return operation based on a circulation setting relating to a unit increase amount. The circulation processing includes first circulation processing and second circulation processing being subsequent to the first circulation processing. The unit increase amount is an amount by which a remaining amount of the liquid in the server tank or the printer tank increases as a result of the second circulation processing, per unit time from an end of the first circulation processing to an end of the second circulation processing. The processes include setting processing of setting the circulation setting to a first setting, and changing the circulation setting from the first setting to a second setting based on information relating to consumption of the liquid inside the server tank or the printer tank in a predetermined time period. A specific tank is a tank, of the server tank and the printer tank, in which the remaining amount of the liquid increases when the circulation processing is performed based on the first setting. The unit increase amount of the specific tank in the second setting is less than the unit increase amount of the specific tank in the first setting.

According to the first aspect, before the circulation setting is changed from the first setting to the second setting, the circulation processing is performed based on the first setting. When the circulation setting is changed from the first setting to the second setting based on the information relating to the consumption of the liquid inside the server tank or the printer tank in the predetermined time period, the circulation processing is performed based on the second setting. In this case, the unit increase amount is less than that of the first setting. Thus, the processor contributes to suppressing the liquid from overflowing from the specific tank in a given time period, compared to a case in which the circulation processing is performed without changing from the first setting.

A second aspect of the present disclosure relates to a control method by a liquid supply system supplying a liquid to a printer tank. The printer tank is a tank provided in a printer. The liquid supply system includes a tube and a liquid delivery mechanism. The tube connects the printer tank and a server tank configured to store the liquid. The liquid delivery mechanism is provided in the tube. The liquid delivery mechanism is configured to perform a supply operation of supplying the liquid from the server tank to the printer tank via the tube, and a return operation of returning the liquid from the printer tank to the server tank via the tube. The control method includes circulation processing of causing the liquid delivery mechanism to perform the supply operation and the return operation based on a circulation setting relating to a unit increase amount. The circulation processing includes first circulation processing and second circulation processing being subsequent to the first circulation processing. The unit increase amount is an amount by which a remaining amount of the liquid in the server tank or the printer tank increases as a result of the second circulation processing, per unit time from an end of the first circulation processing to an end of the second circulation processing. The control method includes setting processing of setting the circulation setting to a first setting, and changing the circulation setting from the first setting to a second setting based on information relating to consumption of the liquid inside the server tank or the printer tank in a predetermined time period. A specific tank is a tank, of the server tank and the printer tank, in which the remaining amount of the liquid increases when the circulation processing is performed based on the first setting. The unit increase amount of the specific tank in the second setting is less than the unit increase amount of the specific tank in the first setting.

The second aspect contributes to the seme advantage as the first aspect.

A third aspect of the present disclosure relates to a non-transitory computer-readable medium storing computer-readable instructions executed by a computer of a liquid supply system supplying a liquid to a printer tank. The printer tank is a tank provided in a printer. The liquid supply system includes a tube and a liquid delivery mechanism. The tube connects the printer tank and a server tank configured to store the liquid. The liquid delivery mechanism is provided in the tube. The liquid delivery mechanism is configured to perform a supply operation of supplying the liquid from the server tank to the printer tank via the tube, and a return operation of returning the liquid from the printer tank to the server tank via the tube. The instructions, when executed by the computer, causes the computer to perform processes. The processes include circulation processing of causing the liquid delivery mechanism to perform the supply operation and the return operation based on a circulation setting relating to a unit increase amount. The circulation processing includes first circulation processing and second circulation processing being subsequent to the first circulation processing. The unit increase amount is an amount by which a remaining amount of the liquid in the server tank or the printer tank increases as a result of the second circulation processing, per unit time from an end of the first circulation processing to an end of the second circulation processing. The processes include setting processing of setting the circulation setting to a first setting, and changing the circulation setting from the first setting to a second setting based on information relating to consumption of the liquid inside the server tank or the printer tank in a predetermined time period. A specific tank is a tank, of the server tank and the printer tank, in which the remaining amount of the liquid increases when the circulation processing is performed based on the first setting. The unit increase amount of the specific tank in the second setting is less than the unit increase amount of the specific tank in the first setting.

The third aspect contributes to the seme advantage as the first aspect.

A fourth aspect of the present disclosure relates to a liquid supply device supplying a liquid to a printer tank. The printer tank is a tank provided in a printer. The liquid supply device includes a tube, a liquid delivery mechanism, a processor, and a memory. The tube connects the printer tank and a server tank configured to store the liquid. The liquid delivery mechanism is provided in the tube, and is configured to perform a supply operation of supplying the liquid from the server tank to the printer tank via the tube, and a return operation of returning the liquid from the printer tank to the server tank via the tube. The memory storing computer-readable instructions that, when executed by the processor, cause the processor to perform processes. The processes include circulation processing of causing the liquid delivery mechanism to perform the supply operation and the return operation based on a circulation setting relating to a unit increase amount. The circulation processing includes first circulation processing and second circulation processing being subsequent to the first circulation processing. The unit increase amount is an amount by which a remaining amount of the liquid in the server tank or the printer tank increases as a result of the second circulation processing, per unit time from an end of the first circulation processing to an end of the second circulation processing. The processes include setting processing of setting the circulation setting to a first setting, and changing the circulation setting from the first setting to a second setting based on information relating to consumption of the liquid inside the server tank or the printer tank in a predetermined time period. A specific tank is a tank, of the server tank and the printer tank, in which the remaining amount of the liquid increases when the circulation processing is performed based on the first setting. The unit increase amount of the specific tank in the second setting is less than the unit increase amount of the specific tank in the first setting.

The fourth aspect contributes to the seme advantage as the first aspect.

OVERALL CONFIGURATION OF LIQUID SUPPLY SYSTEM 100

Figure 1:
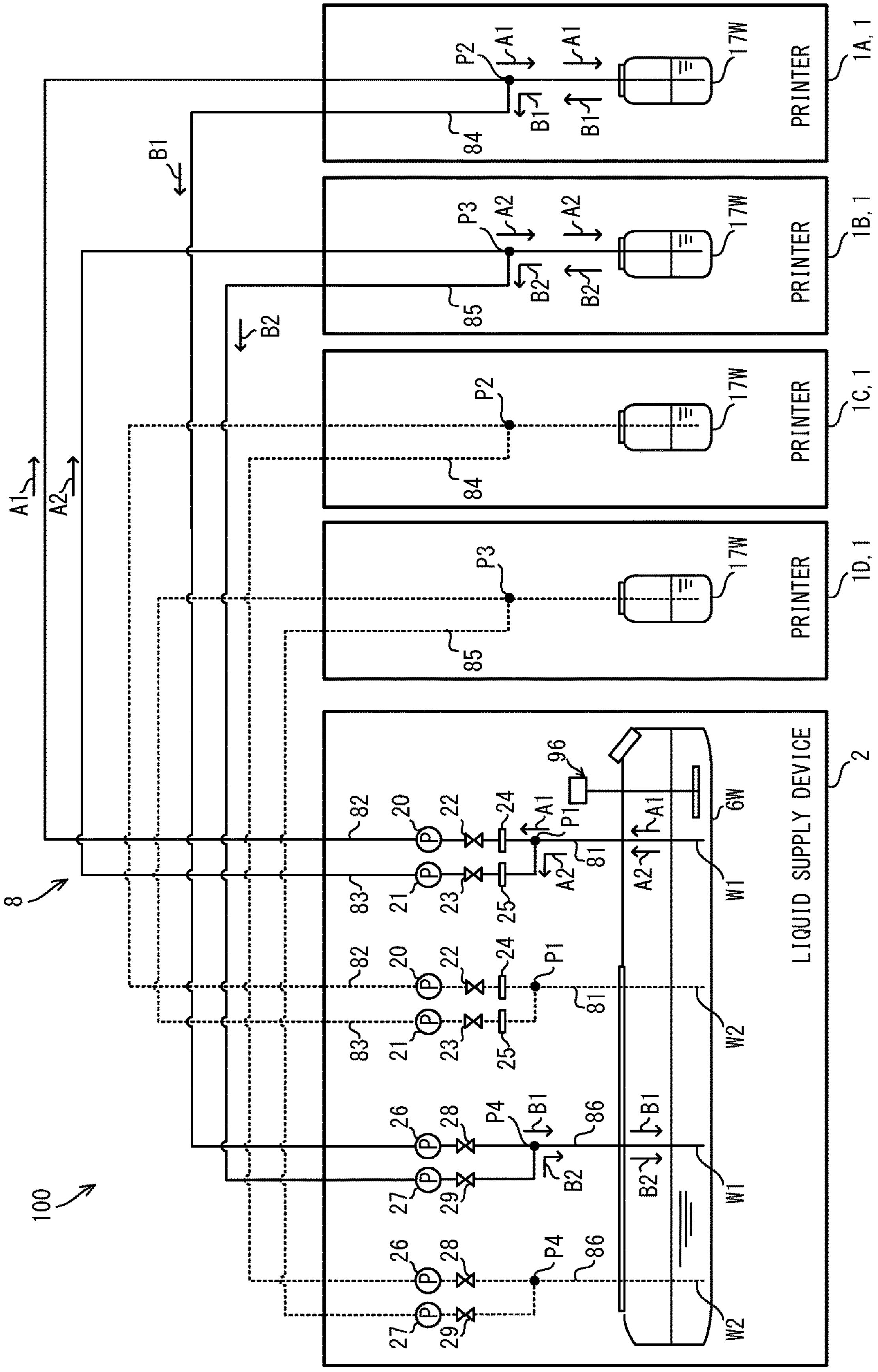
FIG. 1 is a flow path configuration diagram of a liquid supply system.

A liquid supply system 100 according to an embodiment of the present disclosure will be described with reference to the appended drawings. As shown in FIG. 1, the liquid supply system 100 includes a plurality of printers 1, and a liquid supply device 2. The liquid supply system 100 supplies an ink, for example, as a liquid, to each of the plurality of printers 1, from the liquid supply device 2.

A number of the plurality of printers 1 is not limited to a particular number, and, for example, four printers 1A, 1B, 1C, and 1D are connected to the single liquid supply device 2. The printer 1 is an inkjet printer, for example, and performs printing by ejecting the ink onto a print medium (not shown in the drawings). The print medium is a cloth, paper, or the like, and is a T-shirt, for example.

The ink is, for example, white (W), black (K), yellow (Y), cyan (C), or magenta (M). Hereinafter, of the five colors of the ink, the white color ink will be referred to as "white ink," and when the four colors of the black, cyan, yellow and magenta inks are collectively referred to, or when one of the inks is not particularly specified, they will be referred to as "color inks."

The white ink is used in printing as a portion representing white in an image, or as a base for the color inks. The color inks are ejected directly onto the print medium, or onto the base created using the white ink, and are used in printing of a color image.

<Mechanical Configuration of Printer 1>

Figure 2:
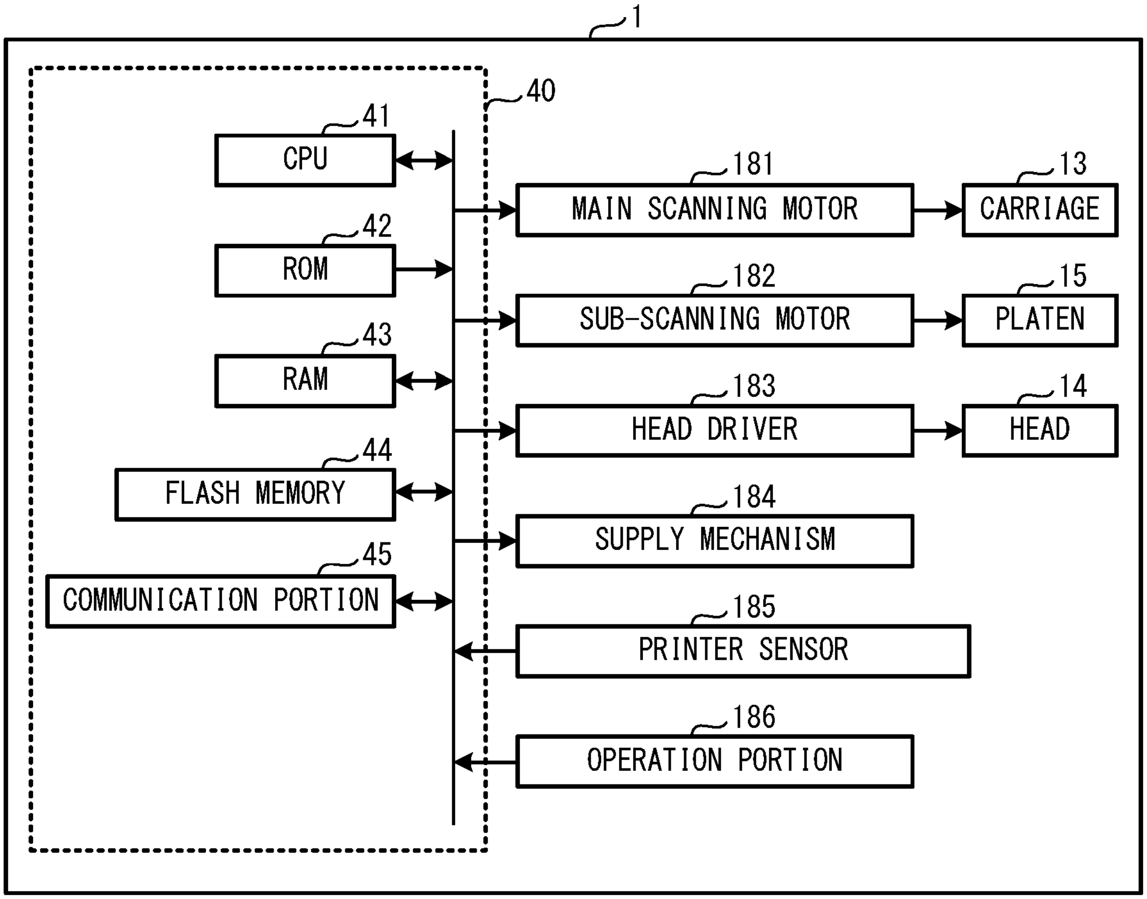
FIG. 2 is a block diagram showing an electrical configuration of a printer.

The printer 1 is provided with a platen 15, a carriage 13, and a head 14 shown in FIG. 2. The platen 15 is provided to be moveable in a sub-scanning direction. The print medium is placed on the platen 15. The carriage 13 is provided to be movable in a main scanning direction. The main scanning direction is orthogonal to the sub-scanning direction.

The head 14 is mounted to the carriage 13, and moves together with the carriage 13 in the main scanning direction. The head 14 includes nozzles and ejects white ink from the nozzles onto the print medium on the platen 15. In addition to the head 14, the printer 1 is provided with a head or a plurality of heads (hereinafter referred to as the "other heads"). In the present embodiment, the other heads are not shown in the drawings, and a description thereof is simplified. The other heads are different from the head 14 in that the other heads eject the color inks, rather than the white ink, from the nozzles onto the print medium on the platen 15.

The printer 1 is provided with a printer tank 17W. The printer tank 17W receives the supply of the white ink from the liquid supply device 2, and stores the supplied white ink. The printer tank 17W is connected to the head 14 shown in FIG. 2, via a tube (not shown in the drawings).

In addition to the printer tank 17W, the printer 1 is provided with a plurality of printer tanks (hereinafter referred to as "other printer tanks"). In the present embodiment, the other printer tanks are not shown in the drawings, and a description thereof is simplified. The other printer tanks differ from the printer tank 17W in that the other printer tanks receive the supply of the color inks from the liquid supply device 2, in place of the white ink. The other printer tanks are connected to the other heads via tubes (not shown in the drawings).

The white ink is supplied from the printer tank 17W to the head 14 shown in FIG. 2 via the tube (not shown in the drawings), by the driving of a supply mechanism 184 shown in FIG. 2. Similarly, the color inks are supplied to the other heads from the other printer tanks. The carriage 13 moves in the main scanning direction as a result of the driving of a main scanning motor 181 shown in FIG. 2. The platen 15 moves in the sub-scanning direction as the result of the driving of a sub-scanning motor 182 shown in FIG. 2. In this way, the head 14 moves in the main scanning direction and the sub-scanning direction relative to the print medium on the platen 15.

While the head 14 moves in the main scanning direction and the sub-scanning direction relative to the print medium on the platen 15, the head 14 ejects the white ink from the nozzles onto the print medium on the platen 15 as a result of the driving of a head driver 183 shown in FIG. 2. Similarly, the other heads eject the color inks from the nozzles onto the print medium on the platen 15. As a result of the above, the printer 1 performs print processing of printing on the print medium.

<Mechanical Configuration of Liquid Supply Device 2>

The liquid supply device 2 is provided with a server tank 6W, tubes 8, and an agitation mechanism 96. The server tank 6W is positioned outside the plurality of printers 1, and stores the white ink. A capacity of the white ink that can be stored by the server tank 6W is greater than a capacity of the white ink that can be stored by the single printer tank 17W, and is greater than a total of the capacities of the white ink that can be stored by the printer tanks 17W of the printers 1A, 1B, 1C, and 1D. The tubes 8 configure flow paths of the white ink between the server tank 6W and the respective printer tanks 17W of the plurality of printers 1.

Figure 3:
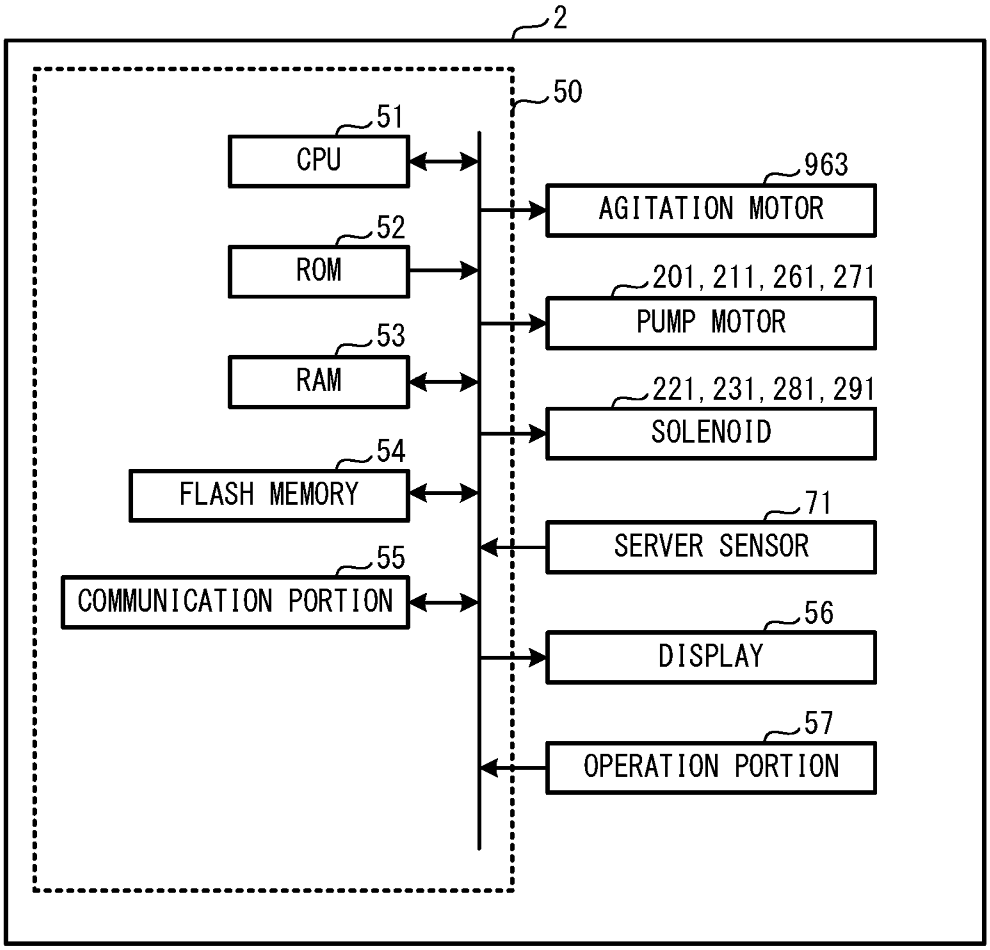
FIG. 3 is a block diagram showing an electrical configuration of the liquid supply device.

The agitation mechanism 96 is a propeller stirrer, for example, and performs an agitation operation of agitating the white ink inside the server tank 6W, as a result of the driving of an agitation motor 963 shown in FIG. 3. In the present embodiment, the white ink includes, as solid components such as pigment particles and the like, components that are more prone to settling than components included in the color inks. The component prone to settling is titanium oxide, for example. The titanium oxide is a type of inorganic pigment having a relatively high specific gravity. Since the white ink includes the component that is relatively prone to settling, the pigment particles and the like in the white ink easily precipitate as the solid components. Hereinafter, the precipitation of the solid components in the white ink will also be referred to as "settling of the white ink." By performing the agitation operation, the agitation mechanism 96 suppresses the settling of the white ink inside the server tank 6W.

Note that, in addition to the server tank 6W, the liquid supply device 2 is provided with a plurality of server tanks (hereinafter referred to as "other server tanks") and, in addition to the tubes 8, is provided with a plurality of tubes (hereinafter referred to as "other tubes"). In the present embodiment, the other server tanks and the other tubes are not shown in the drawings, and a description thereof is simplified.

The other server tanks differ from the server tank 6W in that the other server tanks store the color inks rather than the white ink. The other tubes configure flow paths of the color inks between the other server tanks and respective other printer tanks of the plurality of printers 1. The other tubes differ from the tube 8 in that the other tubes are not provided with tubes 84, 85, and 86 to be described later. Note that in the present embodiment, the agitation mechanism 96 is not provided in the other server tanks.

<Flow Path Configuration of White Ink>

A flow path of the white ink includes a first white flow path W1 and a second white flow path W2. Note that FIG. 1 shows the first white flow path W1 using solid lines and shows the second white flow path W2 using dotted lines. The first white flow path W1 connects the server tank 6W and the respective printer tanks 17W of the printers 1A and 1B to each other. The second white flow path W2 connects the server tank 6W and the respective printer tanks 17W of the printers 1C and 1D to each other.

The first white flow path W1 and the second white flow path W2 differ from each other in whether the connection destination from the liquid supply device 2 is one of the printers 1A and 1B, or the printers 1C and 1D. Thus, hereinafter, the first white flow path W1 will be described and, for the second white flow path W2, the same reference signs will be assigned as for the first white flow path W1 and the description thereof will be omitted or simplified.

The first white flow path W1 is configured by tubes 81, tubes 82 and 83, and tubes 84, 85, and 86 as the tubes 8. The tube 81 is connected to the server tank 6W. The tube 81 extends from inside the server tank 6W to a point P1. The tube 81 is connected to the tube 82 and the tube 83 at the point P1.

The tube 82 extends from the point P1 toward the printer tank 17W of the printer 1A via a point P2, and is connected to the printer tank 17W of the printer 1A. The tube 83 extends from the point P1 toward the printer 1B via a point P3, and is connected to the printer tank 17W of the printer 1B.

The tube 84 is connected to the tube 82 at the point P2. The tube 84 extends from the point P2 to a point P4, and is connected to the tube 86 at the point P4. The tube 85 is connected to the tube 83 at the point P3. The tube 85 extends from the point P3 to the point P4, and is connected to the tube 86 at the point P4. The tube 86 extends from the point P4 toward the server tank 6W, and is connected to the server tank 6W.

Hereinafter, the flow path from the server tank 6W to the printer tank 17W of the printer 1A via the tube 81 and the tube 82, and the flow path from the server tank 6W to the printer tank 17W of the printer 1B via the tube 81 and the tube 83 will be respectively referred to as a "supply flow path." The side of the server tank 6W in the supply flow path will be referred to as "upstream in the supply flow path," and the side of the printer tank 17W of the printer 1A or the printer 1B will be referred to as "downstream in the supply flow path." For example, at a halfway point in the supply flow path, the side of the server tank 6W is upstream in the supply flow path and the side of the printer tank 17W of the printer 1A or the printer 1B is downstream in the supply flow path.

The flow path from the printer tank 17W of the printer 1A to the server tank 6W via the tube 84 and the tube 86, and the flow path from the printer tank 17W of the printer 1B to the server tank 6W via the tube 85 and the tube 86 will be respectively referred to as a "circulation flow path." The side of the printer tank 17W of the printer 1A or the printer 1B in the circulation flow path will be referred to as "upstream in the circulation flow path," and the side of the server tank 6W will be referred to as "downstream in the circulation flow path." For example, at a halfway point in the circulation flow path, the side of the printer tank 17W of the printer 1A or the printer 1B is upstream in the circulation flow path and the side of the server tank 6W is downstream in the circulation flow path.

A supply pump 20, a supply valve 22, and a filter 24 are provided in the tube 82. A supply pump 21, a supply valve 23, and a filter 25 are provided in the tube 83. The supply pump 20 is positioned further upstream in the supply flow path than the point P2. The supply pump 21 is positioned further upstream in the supply flow path than the point P3.

As a result of being respectively driven by pump motors 201 and 211 shown in FIG. 3, the supply pumps 20 and 21 suck up the white ink from the server tank 6W via the tube 81. As a result of being driven by the pump motor 201 shown in FIG. 3, the supply pump 20 sends the sucked up white ink toward the printer tank 17W of the printer 1A, via the tube 82. As a result of being driven by the pump motor 211 shown in FIG. 3, the supply pump 21 sends the sucked up white ink toward the printer tank 17W of the printer 1B, via the tube 83.

Hereinafter, a state in which a valve is closed will be referred to as a "closed state," and a state in which valve is open will be referred to as an "open state." In the closed state, the valve causes the flow path to be in a blocked state. In the open state, the valve causes the flow path to be in a communicated state.

The supply valve 22 is positioned further upstream in the supply flow path than the supply pump 20. The supply valve 23 is positioned further upstream in the supply flow path than the supply pump 21. The supply valves 22 and 23 switch between the closed state and the open state as a result of being driven by solenoids 221 and 231 shown in FIG. 3, respectively. In the closed state, the supply valve 22 causes the tube 82 to be in the blocked state, and in the open state, causes the tube 82 to be in the communicated state. In the closed state, the supply valve 23 causes the tube 83 to be in the blocked state, and in the open state, causes the tube 83 to be in the communicated state.

The filter 24 is positioned further upstream in the supply flow path than the supply valve 22. The filter 25 is positioned further upstream in the supply flow path than the supply valve 23. The filters 24 and 25 are respectively configured by a non-woven fabric, a woven fabric, a resin film, or a porous metal piece, for example, and filter the white ink.

A circulation pump 26 and a circulation valve 28 are provided in the tube 84. A circulation pump 27 and a circulation valve 29 are provided in the tube 85. As a result of being driven by a pump motor 261 shown in FIG. 3, the circulation pump 26 sucks up the white ink from the printer tank 17W of the printer 1A, via a portion of the tube 82 further downstream in the supply flow path than the point P2. As a result of being driven by a pump motor 271 shown in FIG. 3, the circulation pump 27 sucks up the white ink from the printer tank 17W of the printer 1B, via a portion of the tube 83 further downstream in the supply flow path than the point P3. As a result of being respectively driven by the pump motors 261 and 271 shown in FIG. 3, the circulation pumps 26 and 27 send the sucked up white ink toward server tank 6W, via the tube 86.

The circulation valve 28 is positioned further downstream in the supply flow path than the circulation pump 26. The circulation valve 29 is positioned further downstream in the circulation flow path than the circulation pump 27. The circulation valves 28 and 29 switch between the closed state and the open state as a result of being driven by solenoids 281 and 291 shown in FIG. 3, respectively. In the closed state, the circulation valve 28 causes the tube 84 to be in the blocked state, and in the open state, causes the tube 84 to be in the communicated state. In the closed state, the circulation valve 29 causes the tube 85 to be in the blocked state, and in the open state, causes the tube 85 to be in the communicated state.

In the above-described configuration, by causing one or both of the supply valves 22 and 23 to be in the open state and driving, of the supply pump 20 and the supply pump 21, the supply pump corresponding to the valve[s] in the open state, the liquid supply system 100 supplies the white ink from the server tank 6W to the printer tank 17W via the tube 8.

Hereinafter, an operation in which the liquid supply system 100 supplies the liquid from the server tank 6W toward the printer tank 17W via the tube 8 will be referred to as a "supply operation." In the supply operation of the present embodiment, the liquid supply system 100 can supply the white ink from the server tank 6W to each of the plurality of printer tanks 17W of the plurality of printers 1, via the tube 8, in parallel or to one of the plurality of printers 1 at a time. In other words, in each of the supply flow paths to the plurality of printers 1, the server tank 6W is positioned further upstream than each of the plurality of printers 1.

As an example of a flow of the white ink when the supply operation has been performed, a flow of the white ink from the server tank 6W via the tube 8 toward the printer tanks 17W of each of the printers 1A and 1B in the first white flow path W1 will be described. When the white ink is supplied from the server tank 6W to the printer tank 17W of the printer 1A, the white ink flows from the server tank 6W toward the printer tank 17W of the printer 1A via the tube 81 and the tube 82 (refer to arrows A1). When the white ink is supplied from the server tank 6W to the printer tank 17W of the printer 1B, the white ink flows from the server tank 6W toward the printer tank 17W of the printer 1B via the tube 81 and the tube 83 (refer to arrows A2).

In a state in which one or both of the circulation valve 28 and the circulation valve 29 are in the open state, of the circulation pump 26 and the circulation pump 27, the liquid supply system 100 drives the circulation pump corresponding to the valve[s] in the open state, and thus returns the white ink from the printer tank 17W toward the server tank 6W, via the tube 8.

Hereinafter, an operation in which the liquid supply system 100 returns the white ink from the printer tanks 17W toward the server tank 6W via the tube 8 will be referred to as a "return operation." In the return operation of the present embodiment, the liquid supply system 100 can return the white ink from the plurality of printer tanks 17W of each of the plurality of printers 1 to the server tank 6W, via the tube 8, in parallel or from one of the plurality of printers 1 at a time.

As an example of a flow of the white ink when the return operation has been performed, a flow of the white ink from the printer tank 17W of each of the printers 1A and 1B via the tube 8 toward the server tank 6W in the first white flow path W1 will be described. When the white ink is returned to the server tank 6W from the printer tank 17W of the printer 1A, the white ink flows from the printer tank 17W of the printer 1A toward the server tank 6W via the tube 82, the point P2, the tube 84, and the tube 86 (refer to arrows B1). When the white ink is returned to the server tank 6W from the printer tank 17W of the printer 1B, the white ink flows from the printer tank 17W of the printer 1B toward the server tank 6W via the tube 83, the point P3, the tube 85, and the tube 86 (refer to arrows B2).

Both when the white ink is supplied from the server tank 6W to the printer tank 17W of the printer 1A, and when the white ink is returned to the server tank 6W from the printer tank 17W of the printer 1A, the white ink flows through a portion of the tube 82 further downstream in the supply flow path than the point P2. Both when the white ink is supplied from the server tank 6W to the printer tank 17W of the printer 1B, and when the white ink is returned to the server tank 6W from the printer tank 17W of the printer 1B, the white ink flows through a portion of the tube 83 further downstream in the supply flow path than the point P3.

By performing one of the supply operation or the return operation after the other operation has been performed, the liquid supply system 100 can circulate the white ink between the server tank 6W and the respective printer tanks 17W of the plurality of printers 1, via the tubes 8. By alternating the supply operations and return operations, the liquid supply system 100 may circulate the white ink between the server tank 6W and the respective printer tanks 17W of the plurality of printers 1, via the tubes 8.

Hereinafter, an operation in which the liquid supply system 100 circulates the white ink between the server tank 6W and the printer tank 17W via the tube 8 will be referred to as a "circulation operation." The liquid supply system 100 performs the circulation operation in the first white flow path W1, for example. In this way, the liquid supply system 100 suppresses the white ink from settling inside the server tank 6W and in the first white flow path W1, and in the respective printer tanks of the printers 1A and 1B.

<Electrical Configuration of Printer 1>

As shown in FIG. 2, the printer 1 is provided with a control device 40. The control device 40 is provided with a CPU 41, a ROM 42, a RAM 43, a flash memory 44, and a communication portion 45. The CPU 41 controls the printer 1, and functions as a processor. The CPU 41 controls the print processing, for example. The CPU 41 is electrically connected to the ROM 42, the RAM 43, the flash memory 44, and the communication portion 45.

The ROM 42 stores a control program for the CPU 41 to control operations of the printer 1, information necessary for the CPU 41 when executing various programs, and the like. The RAM 43 temporarily stores various data and the like used by the control program. The flash memory 44 is non-volatile, and stores calibration data of printer sensors 185 to be described later, and the like. The communication portion 45 is a controller for communicating, in a wired or wireless manner with an external device. The CPU 41 communicates with the liquid supply device 2, for example, using the communication portion 45.

The main scanning motor 181, the sub-scanning motor 182, the head driver 183, the supply mechanism 184, the plurality of printer sensors 185, and an operation portion 186 are electrically connected to the CPU 41. The main scanning motor 181, the sub-scanning motor 182, the head driver 183, and the supply mechanism 184 are driven by control of the CPU 41.

The printer sensor 185 is provided in the printer tank 17W shown in FIG. 1. The printer sensor 185 is a pressure sensor, for example. The printer sensor 185 detects a printer remaining amount by detecting a pressure inside the printer tank 17W. The printer remaining amount is a remaining amount of the white ink inside the printer tank 17W. A signal indicating the printer remaining amount detected by the printer sensor 185 is output to the CPU 41.

The operation portion 186 is a touch panel display or the like, displays various information, and outputs information to the CPU 41 in accordance with an operation by the user. By operating the operation portion 186, the user can input, to the printer 1, a print command for starting printing by the printer 1 and the like.

<Electrical Configuration of Liquid Supply Device 2>

As shown in FIG. 3, the liquid supply device 2 is provided with a control device 50. The control device 50 is provided with a CPU 51, a ROM 52, a RAM 53, a flash memory 54, and a communication portion 55. The CPU 51 controls the liquid supply device 2, and functions as a processor. The CPU 51 is electrically connected to the ROM 52, the RAM 53, the flash memory 54, and the communication portion 55.

The ROM 52 stores a control program for the CPU 51 to control operations of the liquid supply device 2, information necessary for the CPU 51 when executing various programs, and the like. The RAM 53 temporarily stores various data and the like used by the control program. The flash memory 54 is non-volatile, and stores calibration data of the server sensors 71, and the like. The communication portion 55 is a controller for communicating, in a wired or wireless manner with an external device. The CPU 51 communicates with each of the printers 1A, 1B, 1C, and 1D, for example, via the communication portion 55.

The agitation motor 963, the pump motors 201, 211, 261, and 271, the solenoids 221, 231, 281, and 291, the server sensor 71, the display 56, and the operation portion 57 are electrically connected to the CPU 51.

The agitation motor 963, the pump motors 201, 211, 261, and 271, the solenoids 221, 231, 281, and 291, and the display 56 are driven by control of the CPU 51. The server sensor 71 is a weight sensor, for example, and detects a server remaining amount by the weight. The server remaining amount is a remaining amount of the white ink inside the server tank 6W. A signal indicating the server remaining amount detected by the server sensor 71 is output to the CPU 51.

<Error Between Remaining Amounts>

In the present embodiment, oscillation may occur in the white ink inside the server tank 6W due to the circulation operation, or a minute amount of the white ink may flow from one to the other of the server tank 6W and the tube 8 after the end of the circulation operation. In this case, there is a possibility that an error may occur between the server remaining amount detected by the server sensor 71 and the actual server remaining amount.

Similarly, oscillation may occur in the white ink inside the printer tank 17W due to the circulation operation, or a minute amount of the white ink may flow from one to the other of the printer tank 17W and the tube 8 after the circulation operation. In this case, there is a possibility that an error may occur between the printer remaining amount detected by the printer sensor 185 and the actual printer remaining amount.

When the above-described error occurs, there is a possibility that the actual server remaining amount after the circulation operation may change from the server remaining amount before the circulation operation, and that the actual printer remaining amount after the circulation operation may change from the printer remaining amount before the circulation operation. For example, in the present embodiment, the actual server remaining amount after the circulation operation may decrease from the server remaining amount before the circulation operation, and the actual printer remaining amount after the circulation operation may increase from the printer remaining amount before the circulation operation. In this case, as a result of repeatedly performing the circulation operation, there is a possibility that the white ink may overflow from the printer tank 17W. In the present embodiment, by performing main processing to be described below, the liquid supply system 100 contributes to suppressing the white ink from overflowing from the printer tank 17W in a given time period.

<Main Processing>

Figure 4:
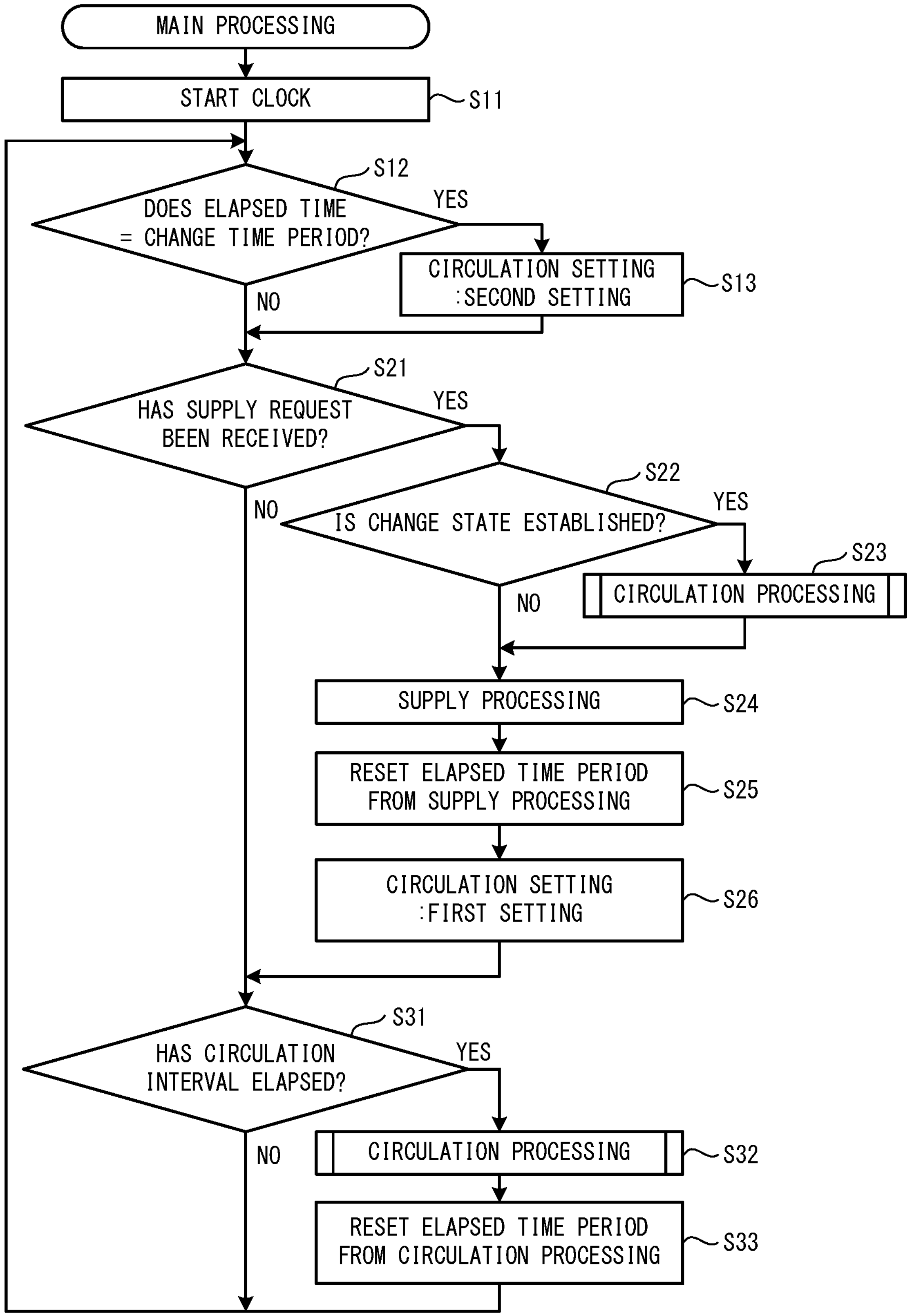
FIG. 4 is a flowchart of main processing.

When a power supply to the liquid supply device 2 is turned on, for example, the CPU 51 performs the main processing shown in FIG. 4, by reading out and executing the control program from the ROM 52. In the main processing, the CPU 51 performs control relating to the supply operation and the return operation. In the main processing, the control relating to the supply operation and the return operation is performed for the second white flow path W2 in a similar manner as for the first white flow path W1. In the present embodiment, with respect to the main processing, the control relating to the first white flow path W1 will be described and a description of the control relating to the second white flow path W2 will be omitted.

Hereinafter, the description will be made assuming that, at the start of the main processing, all of the supply valves 22 and 23 and the circulation valves 28 and 29 shown in FIG. 1 are in the closed state. Furthermore, the description will be made assuming that, at the start of the main processing, a first setting has been set as a circulation setting to be described later. In other words, at the start of the main processing, the first setting is stored in the RAM 53 as the circulation setting. The circulation setting is stored in the RAM 53 for each of the printers 1A and 1B.

As shown in FIG. 4, when the main processing is started, the CPU 51 starts a clock using a timer counter (S11). The timer counter is stored in the RAM 53, and is used for measuring a change time period, a circulation interval and a supply time period to be described later, for each of the printers 1A and 1B.

The CPU 51 refers to the timer counter in the RAM 53, and determines whether or not, for each of the printers 1A and 1B, an elapsed time period from supply processing (S24) to be described later has reached the change time period (S12). The change time period is a time period of a length that is determined in advance, and is stored in advance in the flash memory 54, for example. The length of the change time period is not limited, and is one week, for example. Note that, after the start of the main processing, the CPU 51 determines whether or not the elapsed time period from the start of the main processing has reached the change time period in a state in which the supply processing has not yet been performed, for example.

For example, when the printing has been performed using the white ink in the printer 1, the white ink inside the printer tank 17W is consumed. In this case, the supply processing is performed based on a consumption amount of the white ink inside the printer tank 17W. Thus, when the supply processing is performed, there is a high possibility that the white ink inside the printer tank 17W has been consumed. For example, when the print processing using the white ink has not been performed for a predetermined period using the printer 1, or when the print processing using the white ink has not been frequently performed in the predetermined period, the white ink inside the printer tank 17W is not consumed, or a consumption amount thereof is little. In this case, the supply processing is not performed. Thus, when the supply processing is not performed for the predetermined period, there is a low possibility that the white ink inside the printer tank 17W has been consumed.

In this way, the elapsed time period from the supply processing reaching the change time period means that the white ink inside the printer tank 17W is not being consumed, or that the consumption amount thereof is little. Thus, information relating as to whether or not the elapsed time period from the supply processing has reached the change time period is information relating to the consumption of the white ink inside the printer tank 17W in the predetermined period.

When, for both the printers 1A and 1B, the elapsed time period from the supply processing has not reached the change time period (no at S12), the CPU 51 shifts the processing to S21. When, for either the printer 1A or the printer 1B, the elapsed time period from the supply processing has reached the change time period (yes at S12), for the printer 1 for which the elapsed time period from the supply processing has reached the change time period, the CPU 51 changes the circulation setting to be described later from the first setting to a second setting (S13). In other words, for each of the plurality of printers 1, the CPU 51 changes the circulation setting from the first setting to the second setting based on the information relating to the consumption of the white ink inside the printer tank 17W in the predetermined period. In the processing at S13, for the printer 1 in which the elapsed time period from the supply processing has reached the change time period, the second setting is stored as the circulation setting in the RAM 53. The CPU 51 shifts the processing to S21.

In the present embodiment, circulation processing (S32) to be described later is periodically performed for each of the printers 1A and 1B. First circulation processing and second circulation processing will be defined. The first circulation processing is one of the circulation processing that is periodically performed. The second circulation processing is the circulation processing subsequent to the first circulation processing, of the circulation processing that is periodically performed.

The circulation setting relates to a unit increase amount. The unit increase amount is an amount by which the printer remaining amount increases as a result of the second circulation processing, by unit time from the end of the first circulation processing to the end of the second circulation processing. In the circulation setting, one of the first setting or the second setting is set. In the present embodiment, when the circulation processing is performed on the basis of the first setting, as described above, due to the error occurring between the server remaining amount detected by the server sensor 71 and the actual server remaining amount or the like, the printer remaining amount increases. The unit increase amount of the printer tank 17W in the case of the second setting is less than the unit increase amount of the printer tank 17W in the case of the first setting. In other words, the second setting is the circulation setting with which the unit increase amount of the printer tank 17W is less than with the first setting. The CPU 51 controls the circulation operation based on the set circulation setting.

In the present embodiment, the circulation setting includes the circulation interval, a pump rotation speed, and a pump drive time period. The circulation interval is a time period between the first circulation processing and the second circulation processing. The longer the circulation interval, the less frequently the circulation processing is performed, and thus, the more likely it is for the unit increase amount to be lower. In the first setting, the circulation interval is a first interval time period, and in the second setting, the circulation interval is a second interval time period. The first interval time period is not limited to a specific length, and is four hours, for example. The second interval time period is not limited to a specific length, but is longer than the first interval time period, and is one week, for example.

In the present embodiment, the length of the first interval time period (4 hours) is shorter than the length of the change time period (one week), but may be longer than the length of the change time period, or may be the same as the length of the change time period. The length of the second interval time period (one week) is the same as the length of the change time period (one week), but may be longer or shorter than the length of the change time period.

The pump rotation speed is the rotation speeds (rpm) of each of the supply pumps 20 and 21 and the circulation pumps 26 and 27 in the circulation processing. The slower the pump rotation speed, the lower a circulation amount of the white ink in the circulation processing, and thus, the more likely it is for the unit increase amount to be lower. Note that the circulation amount is a total amount obtained by adding an amount of the white ink supplied from the server tank 6W to the printer tank 17W via the tube 8 in the supply operation and an amount of the white ink returned from the printer tank 17W to the server tank 6W via the tube 8 in the return operation. In the first setting, the pump rotation speed is a first rotation speed, and in the second setting, the pump rotation speed is a second rotation speed. In the present embodiment, the second rotation speed is the same rotation speed as the first rotation speed.

The pump drive time period is a drive time period of each of the supply pumps 20 and 21 and the circulation pumps 26 and 27 in the circulation processing. The shorter the pump drive time period, the lower the circulation amount of the white ink in the circulation processing, and thus, the more likely it is for the unit increase amount to be lower. In the first setting, the pump drive time period is a first drive time period, and in the second setting, the pump drive time period is a second drive time period. In the present embodiment, the second drive time period is the same length as the first drive time period.

In the present embodiment, the second rotation speed is the same as the first rotation speed, and the second drive time period is the same as the first drive time period. The second interval time period is longer than the first interval time period, and thus, a product of the second rotation speed, the second drive time period, and an inverse number of the second interval time period is less than a product of the first rotation speed, the first drive time period, and an inverse number of the first interval time period. Note that, when the values are multiplied together, a unit of each of the parameters (the interval time period, the rotation speed, and the drive time period) is uniform, such as being "minutes," for example.

The CPU 51 determines whether or not a supply request for performing the supply processing (S24) to be described later has been received from the printer 1A or the printer 1B (S21). For example, when the printer 1A performs the print processing, the white ink in the printer tank 17W of the printer 1A is consumed and the printer remaining amount of the printer 1A decreases. For example, in the printer 1A, when the printer remaining amount has become equal to or less than a predetermined supply start remaining amount, the CPU 41 transmits the supply request to the liquid supply device 2. The supply start remaining amount is stored in advance in the flash memory 44, for example.

When the supply request has not been acquired from either the printer 1A or the printer 1B (no at S21), the CPU 51 shifts the processing to S31. When the supply request has been received from the printer 1A or the printer 1B (yes at S21), the CPU 51 determines whether or not a change state is established (S22). The change state is a state in which the elapsed time period from the supply processing has reached the change time period. In other words, the change state is a state in which the second setting is set as the circulation setting. In the processing at S22, the CPU 51 may determine whether or not the change state is established by referring to the timer counter in the RAM 53, for example. The CPU 51 may determine whether or not the change state is present by referring to the circulation setting in the RAM 53, for example.

When the change state is not established (no at S22), the CPU 51 performs the supply processing (S24). When the change state is established (yes at S22), the CPU 51 performs the supply processing (S24) after performing the circulation processing (S23). The circulation processing (S23) will be described in more detail later (refer to FIG. 5).

In the supply processing (S24), the CPU 51 controls the supply operation for the printer 1 from which the supply request has been acquired. For example, when the supply request has been acquired from the printer 1A, the CPU 51 controls the solenoid 221 shown in FIG. 3 in the supply operation, and causes the supply valve 22 shown in FIG. 1 to be in the open state. In this state, the CPU 51 controls the pump motor 201 shown in FIG. 3, and starts the driving of the supply pump 20 shown in FIG. 1. In this way, the white ink is supplied from the server tank 6W to the printer tank 17W of the printer 1A, via the tube 8.

When, for example, the printer remaining amount has reached a predetermined supply stop remaining amount as a result of the supply operation, the CPU 41 transmits a supply stop request to the liquid supply device 2. The supply stop remaining amount is stored in advance in the flash memory 44, for example. The supply stop remaining amount is greater than the supply start remaining amount. When the supply stop request has been acquired from the printer 1A, for example, the CPU 51 stops the driving of the pump motor 201 shown in FIG. 3, and stops the driving of the supply pump 20 shown in FIG. 1. The CPU 51 controls the solenoid 221 shown in FIG. 3 and causes the supply valve 22 shown in FIG. 1 to be in the closed state. In this way, the CPU 51 stops the supply operation and ends the supply processing.

The CPU 51 resets the elapsed time period from the supply processing for the printer 1 from which the supply request has been acquired (S25). In this way, for the printer 1 that has performed the supply processing, the elapsed time period from the supply processing is newly counted, using the most recently performed supply processing as a reference. The CPU 51 sets the first setting as the circulation setting (S26). In other words, the first setting is stored in the RAM 53 as the circulation setting. Note that, if the change state is not present, this means that the first setting is already set as the circulation setting, and the first setting is maintained.

The CPU 51 refers to the timer counter in the RAM 53, and determines, for each of the printers 1A and 1B, whether or not the elapsed time period from the circulation processing has reached the circulation interval (S31). For example, when the circulation setting in each of the printers 1A and 1B is the first setting, in the processing at S31, the CPU 51 determines, for each of the printers 1A and 1B, whether or not the elapsed time period from the circulation processing has reached the first interval time period. When, for example, the circulation setting in the printer 1A is the first setting, and the circulation setting in the printer 1B is the second setting, in the processing at S31, for the printer 1A, the CPU 51 determines whether or not the elapsed time period from the circulation processing has reached the first interval time period, and, for the printer 1B, whether or not the elapsed time period from the circulation processing has reached the second interval time period.

When the elapsed time period from the circulation processing has not reached the circulation interval for either of the printers 1A and 1B (no at S31), the CPU 51 returns the processing to S12. When, for the printer 1A or the printer 1B, the elapsed time period from the circulation processing has reached the circulation interval (yes at S31), the CPU 51 performs the circulation processing based on the set circulation setting, for the printer 1 in which the circulation interval has elapsed (S32). In the circulation processing, the CPU 51 controls the circulation operation. The circulation processing will be described in more detail later (refer to FIG. 5). The CPU 51 resets the elapsed time period from the circulation processing (S33). In this way, for the printer 1 that has performed the circulation processing, the elapsed time period from the circulation processing is newly counted, using the most recently performed circulation processing as a reference. The CPU 51 returns the processing to S12.

<Circulation Processing>

The circulation processing (S23, S32) is performed when the CPU 51 has acquired the supply request from the printer 1 (yes at S21), and when the elapsed time period from the circulation processing has reached the circulation interval (yes at S31). A description will be made using, as applicable, a case in which the CPU 51 has received the supply request from the printer 1A (yes at S21), and a case in which the elapsed time period from the circulation processing for the printer 1A has reached the circulation interval as examples. Note that the circulation processing at S32 is performed based on the circulation setting that is currently set. The circulation processing at S23 may be performed based on the circulation setting that is set, or may always be performed based on the first setting, for example. The circulation processing at S23 may be controlled, for example, such that the unit increase amount becomes greater than the unit increase amount in the first setting. The circulation processing at S23 may be controlled, for example, such that the unit increase amount is less than the unit increase amount in the first setting and is greater than the unit increase amount in the second setting, or may be controlled, for example, such that the unit increase amount is less than the unit increase amount in the second setting.

Figure 5:
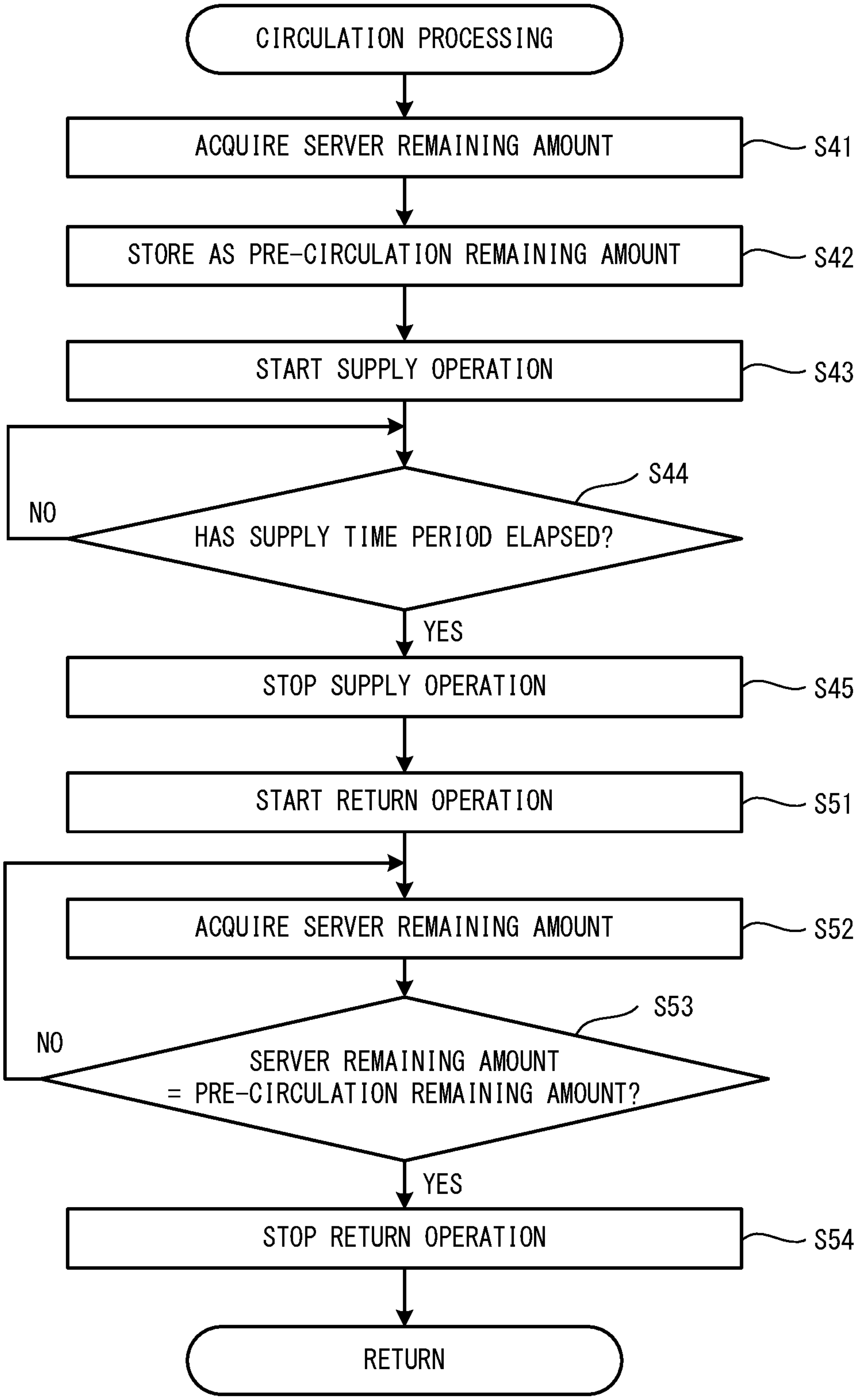
FIG. 5 is a flowchart of circulation processing.

As shown in FIG. 5, when the circulation processing is started, the CPU 51 acquires the server remaining amount from the server sensor 71 shown in FIG. 3 (S41). The CPU 51 stores the server remaining amount acquired by the processing at S41 in the RAM 53, as a pre-circulation remaining amount (S42). The pre-circulation remaining amount is the server remaining amount before the supply operation is started by processing at S43 to be described later.

The CPU 51 starts the supply operation (S43). In the processing at S43, the CPU 51 controls the solenoid 221 shown in FIG. 3 and causes the supply valve 22 shown in FIG. 1 to be in the open state. In this state, the CPU 51 controls the pump motor 201 shown in FIG. 3, based on the circulation setting that is currently set, for example, and starts the driving of the supply pump 20 shown in FIG. 1. In this way, the white ink is supplied from the server tank 6W to the printer tank 17W of the printer 1A, via the tube 8.

The CPU 51 refers to the timer counter in the RAM 53, and determines whether or not the supply time period has elapsed (S44). The supply time period is a time period from the start to the end of the supply operation, and is stored in advance in the flash memory 54, for example. The supply time period corresponding to the first drive time period and the supply time period corresponding to the second drive time period may be stored in the flash memory 54. In this case, the CPU 51 determines whether or not the supply time period corresponding to the currently set circulation setting has elapsed.

When the supply time period has not elapsed (no at S44), the CPU 51 repeats the processing at S44 until the supply time period has elapsed. When the supply time period has elapsed (yes at S44), the CPU 51 stops the supply operation (S45). In the processing at S45, the CPU 51 stops the driving of the pump motor 201 shown in FIG. 3, and stops the driving of the supply pump 20 shown in FIG. 1. The CPU 51 controls the solenoid 221 shown in FIG. 3, and causes the supply valve 22 shown in FIG. 1 to be in the closed state. In this way, the supply of the white ink from the server tank 6W to the printer tank 17W of the printer 1A via the tube 8 is stopped.

The CPU 51 starts the return operation (S51). In the processing at S51, the CPU 51 controls the solenoid 281 shown in FIG. 3, and causes the circulation valve 28 shown in FIG. 1 to be in the open state. In this state, the CPU 51 controls the pump motor 261 shown in FIG. 3 based on the circulation setting that is currently set, for example, and starts the driving of the circulation pump 26 shown in FIG. 1. In this way, the white ink is returned from the printer tank 17W of the printer 1A to the server tank 6W via the tube 8.

The CPU 51 acquires the server remaining amount from the server sensor 71 shown in FIG. 3 (S52). The CPU 51 determines whether or not the server remaining amount acquired by the processing at S52 has reached the pre-circulation remaining amount stored by the processing at S42 (S53).

When the server remaining amount is less than the pre-circulation remaining amount (no at S53), the CPU 51 returns the processing to S52. When the server remaining amount has reached the pre-circulation remaining amount (yes at S53), the CPU 51 stops the return operation (S54). In the processing at S54, the CPU 51 stops the driving of the pump motor 261 shown in FIG. 3, and stops the driving of the circulation pump 26 shown in FIG. 1. The CPU 51 controls the solenoid 281 shown in FIG. 3 and causes the circulation valve 28 shown in FIG. 1 to be in the closed state. In this way, the returning of the white ink from the printer tank 17W of the printer 1A to the server tank 6W via the tube 8 is stopped. The CPU 51 returns the processing to the main processing shown in FIG. 4.

<Effects of Embodiment>

In the above-described embodiment, the liquid supply system 100 supplies the white ink to the printer tank 17W provided in the printer 1. The tube 8 connects the printer tank 17W and the server tank 6W storing the white ink. The supply pumps 20 and 21, the supply valves 22 and 23, the circulation pumps 26 and 27, and the circulation valves 28 and 29 (hereinafter referred to as a "liquid delivery mechanism") are provided in the tube 8, and perform the supply operation of supplying the white ink from the server tank 6W to the printer tank 17W via the tube 8, and the return operation of returning the white ink from the printer tank 17W to the server tank 6W via the tube 8. In the circulation processing (S32), the CPU 51 causes the liquid delivery mechanism to perform the supply operation and the return operation based on the circulation setting relating to the unit increase amount. The unit increase amount is the amount by which the printer remaining amount increases as a result of the second circulation processing, per unit time from the end of the first circulation processing to the end of the second circulation processing that is subsequent to the first circulation processing. In the setting processing (S13 and S26), the CPU 51 sets the first setting as the circulation setting, and changes the circulation setting from the first setting to the second setting based on the information relating to the consumption of the white ink in the printer tank 17W in the predetermined time period (the elapsed time period from the supply processing). Of the server tank 6W and the printer tank 17W, the printer tank 17W is the tank in which the remaining amount of the white ink increases when the circulation processing is performed based on the first setting. The unit increase amount of the printer tank 17W in the second setting is less than the unit increase amount of the printer tank 17W in the first setting.

For example, when the white ink in the printer tank 17W is frequently consumed in the printer 1, the supply processing is frequently performed, and thus, the elapsed time from the supply processing does not easily reach the change time period. In other words, if, for example, the white ink inside the printer tank 17W enters a non-uniform state (a settled state, for example) before the elapsed time period from the supply processing reaches the change time period, there is a high possibility that the white ink in the non-uniform state inside the printer tank 17W may be used in the printer 1. In this case, it is preferable to resolve the non-uniform state of the white ink inside the printer tank 17W. In the present embodiment, the circulation processing is performed based on the first setting until the elapsed time period from the supply processing reaches the change time period. In the first setting, the unit increase amount is relatively large, and thus, the non-uniform state of the white ink inside the printer tank 17W is easily resolved. In this way, when there is the high possibility of the white ink inside the printer tank 17W being consumed, the circulation processing is performed based on the first setting, and thus, the consumption of the white ink in the non-uniform state inside the printer tank 17W by the printer 1 is suppressed. Note that when the white ink inside the printer tank 17W is consumed in the printer 1, the printer remaining amount decreases. Thus, even when the circulation processing is performed based on the first setting having the relatively high unit increase amount and the printer remaining amount increases, the white ink does not easily overflow from the printer tank 17W due to the decrease in the printer remaining amount corresponding to the consumption of the white ink.

On the other hand, when the white ink inside the printer tank 17W is not consumed for a long time in the printer 1, or when the consumption amount of the white ink inside the printer tank 17W is little, the supply processing is not performed for a long period of time, and thus, the elapsed time from the supply processing may reach the change time period. In the present embodiment, when the circulation setting is changed from the first setting to the second setting based on the information relating to the consumption of the white ink inside the printer tank 17W in the predetermined time period (the elapsed time period from the supply processing), the circulation processing is performed based on the second setting. In this case, since the unit increase amount is less than that of the first setting, the CPU 51 contributes to suppressing the white ink from overflowing from the printer tank 17W in a given time period, compared to when the circulation setting remains as the first setting.

Note that, in the second setting, since the unit increase amount is less than that of the first setting, a frequency and degree of resolving the non-uniform state of the white ink inside the printer tank 17W become lower. When the elapsed time period from the supply processing reaches the change time period, there is a possibility that the white ink inside the printer tank 17W has not been consumed in the printer 1 for a long period of time, or that the consumption amount of the white ink inside the printer tank 17W is little. Thus, even if the white ink inside the printer tank 17W is in the non-uniform state, for example, there is a low possibility that the white ink in the non-uniform state inside the printer tank 17W will be used in the printer 1. Therefore, when the elapsed time period from the supply processing has reached the change time period, the fact that the frequency and degree of resolving the non-uniform state of the white ink inside the printer tank 17W become lower is allowed.

The liquid delivery mechanism includes the supply pumps 20 and 21, and the circulation pumps 26 and 27, and performs the supply operation or the return operation by driving the supply pumps 20 and 21, and the circulation pumps 26 and 27. The circulation setting includes the circulation interval between the first circulation processing and the second circulation processing, the pump rotation speed in the circulation processing, and the pump drive time period in the circulation processing. The product of the second rotation speed, the second drive time period, and the inverse number of the second interval time period is less than the product of the first rotation speed, the first drive time period, and the inverse number of the first interval time period.

According to this configuration, the product of the pump rotation speed, the pump drive time period, and the inverse number of the circulation interval corresponds to an integrated number of rotations of each of the supply pumps 20 and 21 and the circulation pumps 26 and 27 per unit time from the end of the first circulation processing to the end of the second circulation processing. Thus, the liquid supply system 100 contributes to reliably making the unit increase amount of the second setting less than the unit increase amount of the first setting.

The CPU 51 performs the supply processing (S24) that causes the liquid delivery mechanism to perform the supply operation. When performing the supply processing in the state in which the circulation setting has been changed from the first setting to the second setting by the setting processing, the CPU 51 performs the circulation processing before the supply processing.

In the state in which the circulation setting has been set to the second setting, the unit increase amount is less than the state in which the circulation setting has been set to the first setting, and thus, there is a possibility that the state of the white ink in the server tank 6W, the tube 8, or the printer tank 17W is more non-uniform than in the state in which the circulation setting has been set to the first setting. When performing the supply processing in the state in which the circulation setting has been set to the second setting, the CPU 51 causes the state of the white ink in the server tank 6W, the tube 8, or the printer tank 17W to be uniform before performing the supply processing, by performing the circulation processing before the supply processing. Thus, the CPU 51 contributes to suppressing the white ink in the non-uniform state from being supplied from the server tank 6W to the printer tank 17W via the tube 8, while also suppressing the white ink from overflowing from the printer tank 17W in the given time period.

MODIFIED EXAMPLES

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below. Modified examples described below may be combined with each other as appropriate insofar as no contradictions arise. In the above-described embodiment, when the circulation processing is performed based on the first setting, the printer remaining amount increases. In contrast to this, when the circulation processing is performed based on the first setting, the server remaining amount may increase. In this case, the unit increase amount is the amount by which the server remaining amount increases as a result of the second circulation processing, per unit time from the end of the first circulation processing to the end of the second circulation processing. In this case, the CPU 51 contributes to suppressing the white ink from overflowing from the server tank 6W in the given time period, by the circulation processing based on the second setting.

In the above-described embodiment, the second setting may be a setting to not perform the circulation processing (S32). For example, the second interval time period may be an extremely long period of time (one year, for example). In this case, in the state in which the circulation setting has been set to the second setting, in the processing at S31, the circulation interval does not actually elapse, and the CPU 51 thus does not perform the circulation processing (S32).

As long as the product of the second rotation speed, the second drive time period, and the inverse number of the second interval time period is less than the product of the first rotation speed, the first drive time period, and the inverse number of the first interval time period may be the same as the first interval time period or may be shorter than the first interval time period, the second rotation speed may be faster than the first rotation speed, or the second drive time period may be longer than the first drive time period.

As long as the unit increase amount in the second setting is less than the unit increase amount in the first setting, the product of the second rotation speed, the second drive time period, and the inverse number of the second interval time period, may be the same as or greater than the product of the first rotation speed, the first drive time period, and the inverse number of the first interval time period. For example, when the second interval time period is extremely long, the first rotation speed and the first drive time period may be set as values such that the product of the second rotation speed, the second drive time period, and the inverse number of the second interval time period is greater than the product of the first rotation speed, the first drive time period, and the inverse number of the first interval time period.

In the above-described embodiment, the information relating to the consumption of the white ink inside the printer tank 17W in the predetermined time period is the elapsed time from the supply processing. In contrast to this, the information relating to the consumption of the white ink inside the printer tank 17W in the predetermined time period may be the consumption amount of the white ink inside the printer tank 17W in the predetermined time period. For example, the CPU 51 may acquire the printer remaining amount from the printer sensor 185, and may change the circulation setting from the first setting to the second setting when the printer remaining amount has not decreased over the predetermined time period. The information relating to the consumption of the white ink inside the printer tank 17W in the predetermined time period may be the absence or presence of performing the print processing in the printer 1 during the predetermined time period, or may be a number of times the print processing is performed. For example, the CPU 51 may change the circulation setting from the first setting to the second setting when an elapsed time period from the print processing by the printer 1 has reached the change time period.

In the above-described embodiment, the CPU 51 changes the circulation setting from the first setting to the second setting based on the information relating to the consumption of the white ink inside the printer tank 17W in the predetermined time period. In contrast to this, the CPU 51 may change the circulation setting from the first setting to the second setting based on information relating to the consumption of the white ink inside the server tank 6W in the predetermined time period. For example, the CPU 51 may change the circulation setting from the first setting to the second setting when the change time period has elapsed without the server remaining amount decreasing, after the supply processing is performed.

In the above-described embodiment, the CPU 51 may perform the circulation processing at S23 after the supply processing (S24). The CPU 51 may perform the supply processing (S24) without performing the circulation processing at S23, irrespective of whether or not the change state is established. After the circulation processing at S23, in a similar manner to the processing at S33, the CPU 51 may reset the elapsed time period from the circulation processing. Of the periodic circulation processing and non-periodic circulation processing, each of the first circulation processing and the second circulation processing may be the one of the circulation processing and the subsequent circulation processing.

Figure 6:
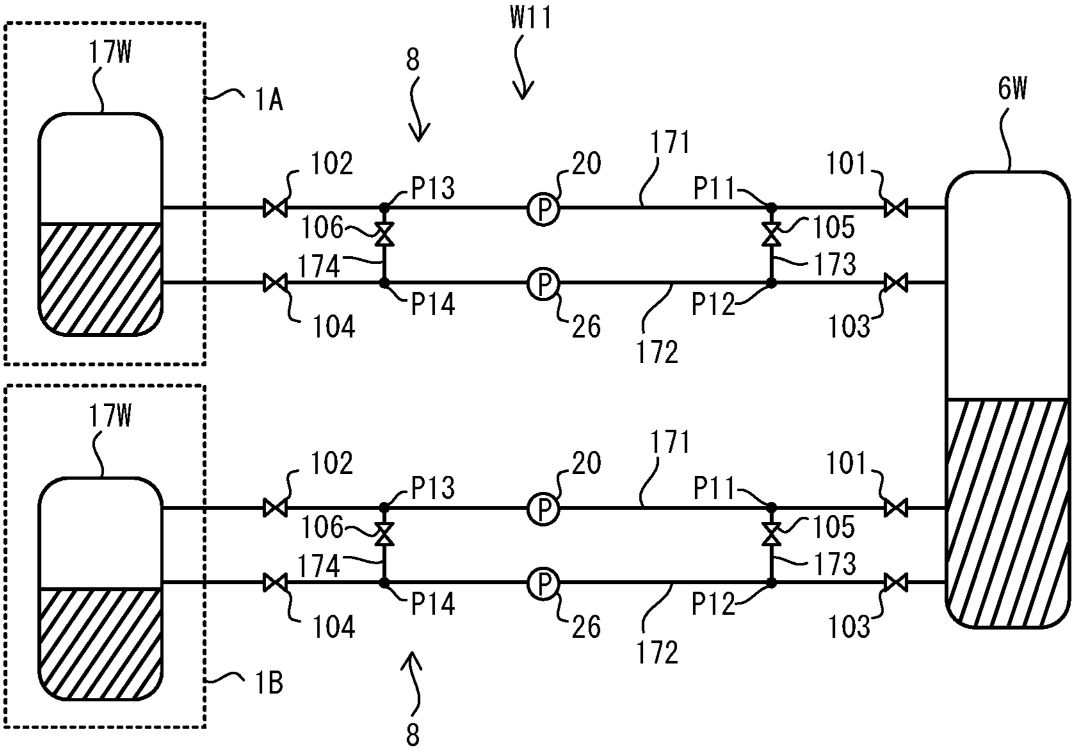
FIG. 6 is a flow path configuration diagram of a first white flow path.
Figure 7:
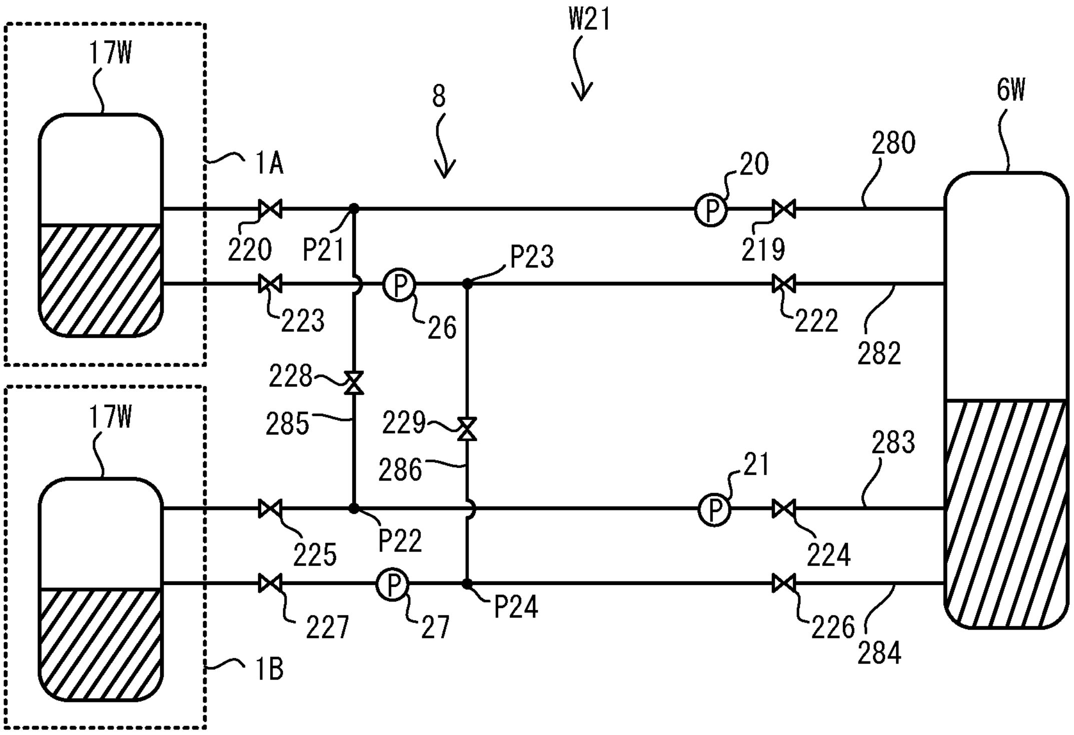
FIG. 7 is a flow path configuration diagram of a first white flow path.

The liquid supply system 100 may change the first white flow path W1 shown in FIG. 1 to a first white flow path W11 shown in FIG. 6, or a first white flow path W21 shown in FIG. 7. Note that the liquid supply system 100 may also change the second white flow path W2 in a similar manner to the first white flow path W1.

As shown in FIG. 6, in the first white flow path W11, the tube 8 for connecting the server tank 6W and the printer tank 17W of the printer 1A, and the tube 8 for connecting the server tank 6W and the printer tank 17W of the printer 1B are provided separately from each other. The configuration of each of the tubes 8 differs only in that the printer 1 to which the server tank 6W is connected is different. Thus, the same reference signs will be assigned, and the tube 8 for connecting the server tank 6W and the printer tank 17W of the printer 1A will be described.

The tube 8 includes tubes 171 and 172. The tube 171 is connected to the server tank 6W. The tube 171 extends from the server tank 6W toward the printer tank 17W of the printer 1A, and is connected to the printer tank 17W of the printer 1A. The tube 172 is connected to the server tank 6W. The tube 172 extends from the server tank 6W toward the printer tank 17W of the printer 1A and is connected to the printer tank 17W of the printer 1A.

The tubes 171 and 172 are connected to each other by a tube 173, and are also connected to each other by a tube 174. The tube 173 is connected to the tube 171 at a point P11. The tube 173 extends from the point P11 and is connected to the tube 172 at a point P12. The point P11 is a position further upstream than the center of the tube 171 in the supply path. The point P12 is a position further downstream than the center of the tube 172 in the circulation path. The tube 174 is connected to the tube 171 at a point P13. The tube 174 extends from the point P13 and is connected to the tube 172 at a point P14. The point P13 is a position further downstream than the center of the tube 171 in the supply path. The point P14 is a position further upstream than the center of the tube 172 in the circulation path. Note that one of the tube 173 and the tube 174 may be omitted.

The supply pump 20 and supply valves 101 and 102 are provided in the tube 171. The supply pump 20 is positioned between the point P11 and the point P13 in the supply flow path. The supply valve 101 is positioned further upstream than the point P11 in the supply flow path. The supply valve 102 is positioned further downstream than the point P13 in the supply flow path. The circulation pump 26 and circulation valves 103 and 104 are provided in the tube 172. The circulation pump 26 is positioned between the point P12 and the point P14 in the circulation flow path. The circulation valve 103 is positioned further downstream than the point P12 in the circulation flow path. The circulation valve 104 is positioned further upstream than the point P14 in the circulation flow path. A connection valve 105 is provided in the tube 173. A connection valve 106 is provided in the tube 174.

An example will be described of the flow of the white ink in the first white flow path W11 when the supply operation has been performed. When the white ink is to be supplied from the server tank 6W to the printer tank 17W of the printer 1A, the supply valves 101 and 102 are in the open state. The connection valves 105 and 106 are in the closed state. The circulation valves 103 and 104 may be in the open state or the closed state. In this state, the supply pump 20 is driven. In this way, the white ink is supplied from the server tank 6W to the printer tank 17W of the printer 1A via the point P11 and the point P13 in the tube 171.

An example will be described of the flow of the white ink in the first white flow path W11 when the return operation has been performed. When the white ink is to be returned from the printer tank 17W of the printer 1A to the server tank 6W, the circulation valves 103 and 104 are in the open state. The connection valves 105 and 106 are in the closed state. The supply valves 101 and 102 may be in the open state or the closed state. In this state, the circulation pump 26 is driven. In this way, the white ink is returned from the printer tank 17W of the printer 1A to the server tank 6W via the point P14 and the point P12 in the tube 172.

Furthermore, in the first white flow path W11, the liquid supply system 100 can perform both a first independent circulation operation and a second independent circulation operation to be described later. Note that the liquid supply system 100 may be configured to be able to perform only one of the first independent circulation operation and the second independent circulation operation.

The first independent circulation operation will be described. The first independent circulation operation is an operation to circulate the white ink via the tubes 171, 172, and 174 from the server tank 6W, without passing through the printer tank 17W. In the first independent circulation operation, the supply valve 101, the circulation valve 103, and the connection valve 106 are in the open state. The supply valve 102 and the circulation valve 104 are in the closed state. The connection valve 105 may be in the open state or the closed state, and is in the closed state, for example. In this state, one or both of the supply pump 20 and the circulation pump 26 are driven. In this way, the white ink flows from the server tank 6W to the point P13 via the point P11 in the tube 171. The white ink flows from the point P13 to the point P14 via the tube 174. The white ink flows from the point P14 to the server tank 6W via the point P12 in the tube 172. In this case, the supply valve 102 is in the closed state, and thus, the white ink does not flow to a portion, in the tube 171, further downstream than the point P13 in the supply flow path. The circulation valve 104 is in the closed state, and thus, the white ink does not flow to a portion, in the tube 172, further upstream than the point P14 in the circulation flow path. As a result, the white ink is not supplied to the printer tank 17W.

The second independent circulation operation will be described. The second independent circulation operation is an operation to circulate the white ink via the tubes 171, 172, and 173 from the printer tank 17W, without passing through the server tank 6W. In the second independent circulation operation, the supply valve 102, the circulation valve 104, and the connection valve 105 are in the open state. The supply valve 101 and the circulation valve 103 are in the closed state. The connection valve 106 may be in the open state or the closed state, and is in the closed state, for example. In this state, one or both of the supply pump 20 and the circulation pump 26 are driven. In this way, the white ink flows from the printer tank 17W to the point P12 via the point P14 in the tube 172. The white ink flows from the point P12 to the point P11 via the tube 173. The white ink flows from the point P11 to the printer tank 17W via the point P13 in the tube 171. In this case, the supply valve 101 is in the closed state, and thus, the white ink does not flow to a portion, in the tube 171, further upstream than the point P11 in the supply flow path. The circulation valve 103 is in the closed state, and thus, the white ink does not flow to a portion, in the tube 172, further downstream than the point P12 in the circulation flow path. As a result, the white ink is not returned to the server tank 6W.

The CPU 51 performs independent circulation processing in the first white flow path W11 when, in the main processing shown in FIG. 4, the circulation setting has been changed from the first setting to the second setting (S13). In this case, the CPU 51 may perform the independent circulation processing before or after the circulation processing (S32), for example, or may perform the independent circulation processing instead of the circulation processing. In the independent circulation processing, the CPU 51 controls the supply pump 20, the circulation pump 26, the supply valves 101 and 102, the circulation valves 103 and 104, and the connection valves 105 and 106, and performs the first independent circulation operation and the second independent circulation operation. The CPU 51 may perform the first independent circulation operation and the second independent circulation operation in that order, or may perform the second independent circulation operation and the first independent circulation operation in that order. For example, the CPU 51 may perform the first independent circulation operation for the printer 1A and perform the second independent circulation operation for the printer 1B in parallel with each other.

When, in the main processing, the circulation setting has been changed from the first setting to the second setting (S13), the CPU 51 may perform the independent circulation processing separately to the circulation processing. For example, the CPU 51 may perform the independent circulation processing when the first interval time period has elapsed after the circulation processing in the state in which the second setting has been set to the circulation setting. In this case, the second setting may be the setting not to perform the circulation processing (S32).

As described above, in the first white flow path W11, the tube 8 includes the tube 171 connecting the server tank 6W and the printer tank 17W, the tube 172 connecting the server tank 6W and the printer tank 17W, and the tubes 173 and 174 connecting the tube 171 and the tube 172. The supply pump 20, the circulation pump 26, the supply valves 101 and 102, the circulation valves 103 and 104, and the connection valves 105 and 106 perform the first independent circulation operation that circulates the white ink in the tube 171, the tube 172, and the tube 174 from the server tank 6W without passing through the printer tank 17W. The supply pump 20, the circulation pump 26, the supply valves 101 and 102, the circulation valves 103 and 104, and the connection valves 105 and 106 perform the second independent circulation operation that circulates the white ink in the tube 171, the tube 172, and the tube 173 from the printer tank 17W without passing through the server tank 6W. When the circulation setting has been changed from the first setting to the second setting, the CPU 51 performs the independent circulation processing that causes the supply pump 20, the circulation pump 26, the supply valves 101 and 102, the circulation valves 103 and 104, and the connection valves 105 and 106 to perform the first independent circulation operation and the second independent circulation operation.

According to this configuration, by the independent circulation processing, the white ink is circulated from the server tank 6W via a portion of the tube 171, a portion of the tube 172, and the tube 174, or the white ink is circulated from the printer tank 17W via a portion of the tube 171, a portion of the tube 172, and the tube 173. In this way, even if there is a possibility that the state of the white ink is non-uniform due the circulation processing based on the second setting, the state of the white ink is made uniform by the independent circulation processing. Thus, the CPU 51 contributes to suppressing the supply of the white ink in the non-uniform state from the server tank 6W to the printer tank 17W via the tube 8, while suppressing the white ink from overflowing from the printer tank 17W in the given time period. Note that the independent circulation processing is not performed before the elapsed time period from the supply processing reaches the change time period, for example. Thus, the liquid supply system 100 contributes to suppressing the supply pump 20, the circulation pump 26, the supply valves 101 and 102, the circulation valves 103 and 104, and the connection valves 105 and 106 from being worn due to the independent circulation processing.

As shown in FIG. 7, in the first white flow path W21, the tube 8 includes tubes 280, 282, 283, 284, 285, and the 286. The tube 280 is connected to the server tank 6W. The tube 280 extends from the server tank 6W toward the printer tank 17W of the printer 1A, and is connected to the printer tank 17W of the printer 1A. The tube 282 is connected to the server tank 6W. The tube 282 extends from the server tank 6W toward the printer tank 17W of the printer 1A, and is connected to the printer tank 17W of the printer 1A.

The tube 283 extends from the server tank 6W toward the printer tank 17W of the printer 1B, and is connected to the printer tank 17W of the printer 1B. The tube 284 is connected to the server tank 6W. The tube 284 extends from the server tank 6W toward the printer tank 17W of the printer 1B, and is connected to the printer tank 17W of the printer 1B.

The tube 285 is connected to the tube 280 at a point P21. The tube 285 extends from the point P21 and is connected to the tube 283 at a point P22. The point P21 is positioned further downstream than the center of the tube 280 in the supply flow path. The point P22 is positioned further downstream than the center of the tube 283 in the supply flow path. The tube 286 is connected to the tube 282 at a point P23. The tube 286 extends from the point P23 and is connected to the tube 284 at a point P24. The point P23 is positioned further upstream than the center of the tube 282 in the circulation flow path. The point P24 is positioned further upstream than the center of the tube 284 in the circulation flow path.

The supply pump 20 and supply valves 219 and 220 are provided in the tube 280. The supply pump 20 is positioned further upstream than the point P21 in the supply flow path. The supply valve 219 is positioned further upstream than the supply pump 20 in the supply flow path. The supply valve 220 is positioned further downstream than the point P21 in the supply flow path. The circulation pump 26 and circulation valves 222 and 223 are provided in the tube 282. The circulation pump 26 is positioned further upstream than the point P23 in the circulation flow path. The circulation valve 222 is positioned further downstream than the point P23 in the circulation flow path. The circulation valve 223 is positioned further upstream than the circulation pump 26 in the circulation flow path.

The supply pump 21 and supply valves 224 and 225 are provided in the tube 283. The supply pump 21 is positioned further upstream than the point P22 in the supply flow path. The supply valve 224 is positioned further upstream than the supply pump 21 in the supply flow path. The supply valve 225 is positioned further downstream than the point P22 in the supply flow path. The circulation pump 27 and circulation valves 226 and 227 are provided in the tube 284. The circulation pump 27 is positioned further upstream than the point P24 in the circulation flow path. The circulation valve 226 is positioned further downstream than the point P24 in the circulation flow path. The circulation valve 227 is positioned further upstream than the circulation pump 27 in the circulation flow path. A connection valve 228 is provided in the tube 285. A connection valve 229 is provided in the tube 286.

An example will be described of the flow of the white ink in the first white flow path W21 when the supply operation has been performed. When the white ink is to be supplied from the server tank 6W to the printer tank 17W of the printer 1A, for example, the supply valves 219 and 220 are in the open state. The connection valve 228 is in the closed state. The supply valves 224 and 225, the circulation valves 222, 223, 226, and 227, and the connection valve 229 may be in the open state or the closed state. In this state, the supply pump 20 is driven. In this way, the white ink is supplied from the server tank 6W to the printer tank 17W of the printer 1A via the point P21 in the tube 280.

An example will be described of the flow of the white ink in the first white flow path W21 when the return operation has been performed. When the white ink is to be returned from the printer tank 17W of the printer 1A to the server tank 6W, for example, the circulation valves 222 and 223 are in the open state. The connection valve 229 is in the closed state. The supply valves 219, 220, 224, and 225, the circulation valves 226 and 227, and the connection valve 228 may be in the open state or the closed state. In this state, the circulation pump 26 is driven. In this way, the white ink is returned from the printer tank 17W of the printer 1A to the server tank 6W via the point P23 in the tube 282.

The liquid supply system 100 can furthermore perform a specific supply operation and a specific return operation in the first white flow path W21. The specific supply operation is an operation to supply the white ink from the server tank 6W toward the printer tank 17W via at least the tube 285 of the tube 8. The specific return operation is an operation to return the white ink from the printer tank 17W to the server tank 6W via at least the tube 286 of the tube 8.

An example will be described of the flow of the white ink in the first white flow path W21 when the specific supply operation has been performed. When the white ink is to be supplied from the server tank 6W to the printer tank 17W of the printer 1B, for example, the supply valves 219 and 225, and the connection valve 228 are in the open state. The supply valves 220 and 224 are in the closed state. The circulation valves 222, 223, 226, and 227, and the connection valve 229 may be in the open state or the closed state. In this state, the supply pump 20 is driven. In this way, the white ink flows from the server tank 6W to the point P21 in the tube 280. The white ink flows from the point P21 to the point P22 via the tube 285. The white ink flows from the point P22 to the printer tank 17W of the printer 1B via the tube 283. In this case, since the supply valve 220 is in the open state, the white ink does not flow to a portion, of the tube 280, further downstream than the point P21 in the supply flow path. Thus, the white ink is not supplied to the printer tank 17W of the printer 1A.

An example will be described of the flow of the white ink in the first white flow path W21 when the specific return operation has been performed. When the white ink is to be returned from the printer tank 17W of the printer 1B to the server tank 6W, for example, the circulation valves 222 and 227, and the connection valve 229 are in the open state. The circulation valves 223 and 226 are in the closed state. The supply valves 219, 220, 224, and 225, and the connection valve 228 may be in the open state or the closed state. In this state, the circulation pump 27 is driven. In this way, the white ink flows from the printer tank 17W of the printer 1B to the point P24 in the tube 284. The white ink flows from the point P24 to the point P23 via the tube 286. The white ink flows from the point P23 to the server tank 6W via the tube 282. In this case, since the circulation valve 223 is in the closed state, the white ink is not returned to the server tank 6W from the printer tank 17W of the printer 1A.

The liquid supply system 100 can circulate the white ink between the server tank 6W and each of the printer tanks 17W of the plurality of printers 1 via the tubes 285 and 286, by performing, after one of the specific supply operation and the specific return operation, the other of the specific supply operation and the specific return operation. The liquid supply system 100 may circulate the white ink between the server tank 6W and each of the printer tanks 17W of the plurality of printers 1 via the tubes 285 and 286 by repeatedly alternating the specific supply operation and the specific return operation. The liquid supply system 100 may circulate the white ink between the server tank 6W and each of the printer tanks 17W of the plurality of printers 1 via the tubes 285 and 286 by performing the other of the specific supply operation and the specific return operation during the execution of the one of the specific supply operation and the specific return operation. Hereinafter, the operation of the liquid supply system 100 to circulate the white ink between the server tank 6W and the printer tank 17W via the tubes 285 and 286 will be referred to as a "specific circulation operation."

When, in the main processing shown in FIG. 4, the circulation setting has been changed from the first setting to the second setting (S13), the CPU 51 performs specific circulation processing in the first white flow path W21. In the specific circulation processing, the CPU 51 controls the supply pumps 20 and 21, the circulation pumps 26 and 27, the supply valves 219, 220, 224, and 225, the circulation valves 222, 223, 226, and 227, and the connection valves 228 and 229, and performs the specific circulation operation.

When the circulation setting has been changed from the first setting to the second setting (S13) for one of the plurality of printers 1 (the printer 1A, for example), in the specific circulation processing, the CPU 51 controls the specific circulation operation to circulate the white ink via the tubes 285 and 286 between the server tank 6W and the printer tank 17W of another one of the plurality of printers 1 (the printer 1B, for example). In this case, the CPU 51 may determine whether or not the printer remaining amount of the other one of the plurality of printers 1 (the printer 1B, for example) is less than the printer remaining amount of the one of the plurality of printers 1 (the printer 1A, for example). When the printer remaining amount of the other one of the plurality of printers 1 (the printer 1B, for example) is less than the printer remaining amount of the one of the plurality of printers 1 (the printer 1A, for example), in the specific circulation processing, the CPU 51 may perform the specific circulation operation to circulate the white ink via the tubes 285 and 286 between the server tank 6W and the printer tank 17W of the other one of the plurality of printers 1 (the printer 1B, for example). The CPU 51 may perform the specific circulation processing before or after the circulation processing (S32), for example, or may perform the specific circulation processing instead of the circulation processing. In this case, for example, the second setting may be a setting to perform the specific circulation processing in addition to the circulation processing (S32). The second setting may be a setting to perform the specific circulation processing instead of the circulation processing (S32), for example.

When, in the main processing, the circulation setting has been changed from the first setting to the second setting (S13), the CPU 51 may perform the specific circulation processing separately to the circulation processing. For example, the CPU 51 may perform the specific circulation processing when the first interval time period has elapsed after the circulation processing in the state in which the second setting is set as the circulation setting. In this case, the second setting may be the setting to not perform the circulation processing (S32), for example.

As described above, in the first white flow path W21, the printer 1 includes in the printer 1A and the printer 1B. The tube 8 includes the tubes 280 282, 283, 284, 285, and 286. The tubes 280 and 282 are respectively connected to the server tank 6W and the printer tank 17W provided in the printer 1A. The tubes 283 and 285 connect the tube 280 and the printer tank 17W provided in the printer 1B. The tubes 284 and 286 connect the tube 280 and the printer tank 17W provided in the printer 1B. The supply pumps 20 and 21, the circulation pumps 26 and 27, the supply valves 219, 220, 224, and 225, the circulation valves 222, 223, 226, and 227, and the connection valves 228 and 229 perform the specific supply operation that supplies the white ink from the server tank 6W to the printer tank 17W of the printer 1A or the printer 1B via the tubes 280, 283, and 285, and the specific return operation that returns the white ink from the printer tank 17W of the printer 1A or the printer 1B to the server tank 6W via the tubes 282, 284, and 286. When the circulation setting has been changed from the first setting to the second setting in the printer 1A, for example, the CPU 51 performs the specific circulation processing that causes the supply pumps 20 and 21, the circulation pumps 26 and 27, the supply valves 219, 220, 224, and 225, the circulation valves 222, 223, 226, and 227, and the connection valves 228 and 229 to perform the specific supply operation that supplies the white ink from the server tank 6W to the printer tank 17W of the printer 1B via the tubes 280, 283, and 285, and the specific return operation that returns the white ink from the printer tank 17W of the printer 1B to the server tank 6W via the tubes 282, 284, and 286.

According to this configuration, the white ink is circulated between the server tank 6W and the printer tank 17W of the printer 1B by the specific circulation processing, without passing through the printer tank 17W of the printer 1A. In this way, even when there is the possibility that the state of the white ink is non-uniform due to the circulation processing based on the second setting for the printer 1A, the state of the white ink is made uniform by the specific circulation processing. Thus, the CPU 51 contributes to suppressing the white ink in the non-uniform state from being supplied from the server tank 6W to the printer tank 17W of the printer 1A via the tube 8, while also suppressing the white ink from overflowing from the printer tank 17W of the printer 1A in the given time period. Note that the specific circulation processing is not performed before the elapsed time period from the supply processing reaches the change time period, for example. Thus, the liquid supply system 100 contributes to suppressing the supply pumps 20 and 21, the circulation pumps 26 and 27, the supply valves 219, 220, 224, and 225, the circulation valves 222, 223, 226, and 227, and the connection valves 228 and 229 from being worn due to the specific circulation processing.

Note that the liquid supply system 100 may omit a portion, of the tube 283, further upstream than the point P22 in the supply flow path. The liquid supply system 100 may omit a portion, of the tube 284, further downstream than the point P24 in the circulation flow path.

Hereinafter, an amount of the white ink supplied from the server tank 6W to the printer tank 17W via the tube 8 by the supply operation in the circulation processing will be referred to as a "circulation supply amount." An amount of the ink returned from the printer tank 17W to the server tank 6W via the tube 8 by the return operation in the circulation processing will be referred to as a "circulation return amount." In the setting processing (S13), the CPU 51 may calculate the circulation supply amount and the circulation return amount based on the server remaining amount or the printer remaining amount, such that the unit increase amount of the printer tank 17W becomes a negative value. Furthermore, the CPU 51 may change the circulation setting from the first setting to the second setting that is based on the calculated circulation supply amount and circulation return amount.

For example, a case will be described in which the CPU 51 calculates the circulation supply amount and the circulation return amount, based on the printer remaining amount, such that the unit increase amount of the printer tank 17W becomes the negative value. In this case, when, for example, the elapsed time period from the supply processing has reached the change time period (yes at S12), the CPU 51 acquires the printer remaining amount from the printer sensor 185. The CPU 51 sets the unit increase amount as the negative value based on a difference between the acquired printer remaining amount and the pre-circulation remaining amount stored by the processing at S42. The "value based on the difference between the acquired printer remaining amount and the pre-circulation remaining amount stored by the processing at S42" is, for example, a value that is the same as that difference, or a value that is greater or less than that difference by a predetermined amount, or the like. The CPU 51 calculates the circulation supply amount and the circulation return amount such that the unit increase amount of the printer tank 17W is the negative value. Specifically, the CPU 51 calculates the circulation supply amount and the circulation return amount such that the circulation supply amount based on the second setting is less than the circulation supply amount based on the first setting, or such that the circulation return amount based on the second setting is greater than the circulation return amount based on the first setting. The CPU 51 sets the circulation setting with the pump rotation speed and the pump drive time period as the second setting, such that the calculated circulation supply amount and circulation return amount are obtained.

According to this configuration, even if the printer remaining amount increases as a result of the circulation processing being performed based on the first setting, for example, when the circulation processing is performed based on the second setting, the printer remaining amount decreases. Thus, the CPU 51 contributes to suppressing the white ink from overflowing from the printer tank 17W in the given time period. Note that the circulation supply amount and the circulation return amount are not calculated before the elapsed time period from the supply processing reaches the change time period, for example. Thus, the liquid supply system 100 contributes to suppressing a control load required for calculating the circulation supply amount and the circulation return amount before the elapsed time period from the supply processing reaches the change time period.

When, for example, the server remaining amount increases as a result of the circulation processing, the CPU 51 may calculate the circulation supply amount and the circulation return amount based on the server remaining amount, such that the unit increase amount of the server tank 6W becomes a negative value. According to this configuration, even if the server remaining amount increases as a result of the circulation processing being performed based on the first setting, for example, when the circulation processing is performed based on the second setting, the server remaining amount decreases. Thus, the CPU 51 contributes to suppressing the white ink from overflowing from the server tank 6W in the given time period.

Furthermore, the CPU 51 may calculate the circulation supply amount and the circulation return amount, based on the server remaining amount or the printer remaining amount, each time the circulation processing is performed based on the second setting. According to this configuration, the CPU 51 contributes to suppressing the remaining amount of the white ink in the printer tank 17W or in the server tank 6W from being excessively decreased in the circulation processing based on the second setting, while also suppressing the white ink from overflowing from the printer tank 17W or the server tank 6W in the given time period. Note that the CPU 51 may calculate the circulation supply amount and the circulation return amount, based on the server remaining amount or the printer remaining amount, each time the circulation processing is performed a plurality of times based on the second setting.

In the circulation processing, the CPU 51 may change an execution order of the supply operation (S43 and S45) and the return operation (S51 and S54). For example, the CPU 51 may perform the supply operation after performing the return operation. The CPU 51 may perform the supply operation and the return operation in parallel with each other. The CPU 51 may alternately repeat the supply operation and the return operation.

In the above-described embodiment, when the supply time period has elapsed (yes at S44), the CPU 51 stops the supply operation (S45). In contrast to this, the CPU 51 may stop the supply operation based on an integrated number of rotations of the supply pumps 20 and 21 from when the supply operation is started by the processing at S43, on a change amount of the server remaining amount from when the supply operation is started by the processing at S43, or the like.

In the above-described embodiment, when the server remaining amount has reached the pre-circulation remaining amount (yes at S53), the CPU 51 stops the return operation (S54). In contrast to this, the CPU 51 may stop the return operation based on an integrated number of rotations of the circulation pumps 26 and 27 from when the return operation is started by the processing at S51, on a change amount of the server remaining amount from when the return operation is started by the processing at S51, or the like. The CPU 51 may control the supply operation and the return operation based on the printer remaining amount.

For example, in the first white flow path W1, the liquid supply device 2 may omit one or both of the supply pumps 20 and 21. For example, when both the supply pumps 20 and 21 are omitted, the CPU 51 controls one or both of the supply valves 22 and 23 to be in the open state and the closed state. In this way, the CPU 51 may control the supply of the white ink to the respective printer tanks 17W of the printers 1A and 1B from the server tank 6W using the liquid head difference between the respective printer tanks 17W of the printers 1A and 1B and the server tank 6W.

For example, in the first white flow path W1, the liquid supply device 2 may omit one or both of the circulation pumps 26 and 27. For example, when both the circulation pumps 26 and 27 are omitted, the CPU 51 controls one or both of the circulation valves 28 and 29 to be in the open state and the closed state. In this way, the CPU 51 may control the return of the white ink from the respective printer tanks 17W of the printers 1A and 1B to the server tank 6W using the liquid head difference between the respective printer tanks 17W of the printers 1A and 1B and the server tank 6W.

For example, in the first white flow path W1, the liquid supply device 2 may omit one or both of the supply valves 22 and 23. In the first white flow path W1, the liquid supply device 2 may omit one or both of the circulation valves 28 and 29. In the first white flow path W1, the liquid supply device 2 may omit one or both of the filters 24 and 25.

In the tube 82, for example, the liquid supply device 2 may change an upstream or downstream positional relationship in the supply flow path of the supply pump 20, the supply valve 22, and the filter 24, as appropriate. Similarly, in the tube 83, for example, the liquid supply device 2 may change an upstream or downstream positional relationship in the supply flow path of the supply pump 21, the supply valve 23, and the filter 25, as appropriate.

In the tube 84, for example, the liquid supply device 2 may change an upstream or downstream positional relationship in the circulation flow path of the circulation pump 26 and the circulation valve 28, as appropriate. Similarly, in the tube 85, for example, the liquid supply device 2 may change an upstream or downstream positional relationship in the circulation flow path of the circulation pump 27 and the circulation valve 29, as appropriate.

The single printer 1 may be connected to the single liquid supply device 2 by the tube 8. The liquid supply device 2 may be provided with only the server tank 6W of the plurality of server tanks, and need not necessarily be provided with the other server tanks. In this case, the printer 1 may be provided with only the printer tank 17W for example, of the plurality of printer tanks, and need not necessarily be provided with the other printer tanks. The printer 1 need not necessarily be provided with the other heads.

The liquid supply system 100 may supply a pre-treatment agent, a post-treatment agent, or water, as the liquid, to each of the plurality of printers 1 from the liquid supply device 2. For example, the water may be used for humidifying the atmosphere inside the printer 1. In this case, the plurality of printers 1 may be respectively provided with a humidifier. The humidifier is provided inside the printer 1 and humidifies the atmosphere inside the printer 1. The tube 8 may connect the server tank storing the water and a tank of the humidifier with each other. The main processing may be applied to a flow path of the water instead of, or in addition to, the first white flow path W1 and the second white flow path W2. Similarly, the main processing may be applied to a flow path of the color inks, the pre-treatment agent, or the post-treatment agent, for example.

The configuration of the printer 1 is not limited to that of the above-described embodiment. For example, in the above-described embodiment, the printer 1 may be a type different from the inkjet printer, and may be a laser printer, a tape printer, or the like. The plurality of heads 14 are not limited to the inkjet heads, and may be thermal heads, or the like. The head 14 and the other heads may be a line head. For example, the printer 1 need not necessarily use ink as the liquid, and it is sufficient that the printer 1 be provided with the humidifier. In this case, the liquid supply system 100 supplies the water from the liquid supply device 2 to the humidifier of the printer 1 via the tube 8.

The server sensor 71 may be an optical sensor or an electrode-type level sensor. In this case, the server sensor 71 may detect the server remaining amount by detecting a height of the liquid surface inside the server tank 6W. The server sensor 71 may be a pressure sensor. In this case, the server sensor 71 may detect the server remaining amount by detecting the pressure inside the server tank 6W.

The printer sensor 185 may be a weight sensor. In this case, the printer sensor 185 may detect the printer remaining amount by detecting the weight of the printer remaining amount. The printer sensor 185 may be an optical sensor or an electrode-type level sensor. In this case, the printer sensor

185 may detect the printer remaining amount by detecting a height of the liquid surface inside the printer tank 17W.

A configuration of the number of the tubes 8, a branching format and the like are not limited to those of the above-described embodiment. For example, the server tank 6W may be connected to the printer tank 17W of the single printer 1 via a plurality of (2, for example) the tubes 8 that do not branch. In this case, in the supply operation and the return operation, the white ink flows through each of the different tubes 8. For example, the tube 84 need not necessarily be connected to the tube 82 at the point P2, and may be directly connected to the server tank 6W of the printer 1A. The tube 85 need not necessarily be connected to the tube 84 at the point P4, and may be directly connected to the server tank 6W. The server tank 6W and the printer tank 17W of the single printer 1 may be connected by the single tube 8 that does not branch. In this case, in each of the supply operation and the return operation, the white ink flows through the same tube 8.

In the above-described embodiment, the liquid supply system 100 may change each of execution conditions for the supply processing and execution conditions for the circulation processing. For example, the CPU 51 may execute the supply processing or the circulation processing when the user operates the operation portion 186 or the operation portion 57, and inputs an instruction to execute the supply processing or the circulation processing to the printer 1 or the liquid supply device 2. The CPU 51 may perform the circulation processing at a time determined in advance.

In the above-described embodiment, the liquid supply system 100 may omit the server sensor 71 and the printer sensor 185. In this case, the CPU 51 may store the server remaining amount and the printer remaining amount of an initial state, for example. Furthermore, by performing time control of the pump motors 201, 211, 261, and 271 using the stored server remaining amount or printer remaining amount as a reference, the CPU 51 may determine a current server remaining amount or printer remaining amount.

The CPU 41 may perform the main processing. In this case, the liquid supply system 100 may omit the CPU 51. The CPU 51 may perform a part of the main processing, and the CPU 41 may perform another part of the main processing. A CPU of an external device may perform the main processing. The external device is a device other than the printer 1 and the liquid supply device 2, and is a personal computer (PC), a smartphone, or the like.

In place of the CPU 41 or 51, a microcomputer, application specific integrated circuits (ASICs), a field programmable gate array (FPGA) or the like may be used as a processor. The main processing may be performed as distributed processing by a plurality of the processors. It is sufficient that the non-transitory storage media, such as the ROM 42 or 52, the flash memory 44 or 54, and the like be a storage medium capable of storing information, regardless of a period of storing the information. The non-transitory storage medium need not necessarily include a transitory storage medium (a transmitted signal, for example). The control program may be downloaded from a server connected to a network (not shown in the drawings) (in other words, may be transmitted as transmission signals), and may be stored in the ROM 42 or 52 or the flash memory 44 or 54. In this case, the control program may be stored in a non-transitory storage medium, such as an HDD provided in the server.

What is claimed is:

1. A liquid supply system supplying a liquid to a printer tank, the printer tank being a tank provided in a printer, the liquid supply system comprising:

a tube connecting the printer tank and a server tank configured to store the liquid;

a liquid delivery mechanism provided in the tube, and being configured to perform a supply operation of supplying the liquid from the server tank to the printer tank via the tube, and a return operation of returning the liquid from the printer tank to the server tank via the tube;

a processor; and a memory storing computer-readable instructions that, when executed by the processor, cause the processor to perform processes comprising:

circulation processing of causing the liquid delivery mechanism to perform the supply operation and the return operation based on a circulation setting relating to a unit increase amount, the circulation processing including first circulation processing and second circulation processing being subsequent to the first circulation processing, the unit increase amount being an amount by which a remaining amount of the liquid in the server tank or the printer tank increases as a result of the second circulation processing, per unit time from an end of the first circulation processing to an end of the second circulation processing; and setting processing of setting the circulation setting to a first setting, and changing the circulation setting from the first setting to a second setting based on information relating to consumption of the liquid inside the server tank or the printer tank in a predetermined time period, a specific tank being a tank, of the server tank and the printer tank, in which the remaining amount of the liquid increases when the circulation processing is performed based on the first setting, the unit increase amount of the specific tank in the second setting being less than the unit increase amount of the specific tank in the first setting.

2. The liquid supply system according to claim 1, wherein the liquid delivery mechanism includes a pump, and performs the supply operation or the return operation by driving the pump, the circulation setting includes an interval between the first circulation processing and the second circulation processing, a rotation speed of the pump in the circulation processing, and a drive time period of the pump in the circulation processing, and a product, in the second setting, of the rotation speed, the drive time period, and an inverse number of the interval is less than a product, in the first setting, of the rotation speed, the drive time period, and the inverse number of the interval.

3. The liquid supply system according to claim 1, wherein the computer-readable instructions instruct the processor to perform processes further comprising:

supply processing of causing the liquid delivery mechanism to perform the supply operation, and performing, when performing the supply processing in a state of the circulation setting being changed from the first setting to the second setting by the setting processing, the circulation processing before the supply processing.

4. The liquid supply system according to claim 1, wherein the tube includes a first tube connecting the server tank and the printer tank, a second tube connecting the server tank and the printer tank, and a third tube connecting the first tube and the second tube, the liquid delivery mechanism further performs an independent circulation operation of circulating the liquid via the first tube, the second tube, and the third tube from the server tank, without passing through the printer tank, or of circulating the liquid via the first tube, the second tube, and the third tube from the printer tank without passing through the server tank, and the computer-readable instructions instruct the processor to perform a process further comprising:

independent circulation processing of causing the liquid delivery mechanism to perform the independent circulation operation when the circulation setting is changed from the first setting to the second setting by the setting processing.

5. The liquid supply system according to claim 1, wherein the printer includes a first printer and a second printer, the tube includes a first tube connecting the server tank and a first printer tank being the printer tank provided in the first printer, a second tube connecting the server tank and the first printer tank, a third tube connecting the first tube and a second printer tank being the printer tank provided in the second printer, and a fourth tube connecting the second tube and the second printer tank, the liquid delivery mechanism performs the supply operation of supplying the liquid from the server tank to the first printer tank via the first tube, the return operation of returning the liquid from the first printer tank to the server tank via the second tube, a specific supply operation of supplying the liquid from the server tank to the second printer tank via the first tube and the third tube, and a specific return operation of returning the liquid from the second printer tank to the server tank via the second tube and the fourth tube, the specific tank is the first printer tank, and the computer-readable instructions instruct the processor to perform a process further comprising:

specific circulation processing of causing the liquid delivery mechanism to perform the specific supply operation and the specific return operation when the circulation setting is changed from the first setting to the second setting by the setting processing.

6. The liquid supply system according to claim 1, wherein in the setting processing, when the circulation setting is to be changed from the first setting to the second setting based on the information, the computer-readable instructions instruct the processor to perform processes comprising:

calculating, based on the remaining amount of the liquid in the server tank or the printer tank, a circulation supply amount that is an amount of the liquid to be supplied from the server tank to the printer tank via the tube by the supply operation in the circulation processing, and a circulation return amount that is an amount of the liquid to be returned from the printer tank to the server tank via the tube by the return operation in the circulation processing, to cause the unit increase amount of the specific tank to become a negative value, and changing the circulation setting from the first setting to the second setting that is based on the calculated circulation supply amount and the calculated circulation return amount.

7. The liquid supply system according to claim 6, wherein in the setting processing, the computer-readable instructions instruct the processor to perform a process comprising:

calculating the circulation supply amount and the circulation return amount each time the circulation processing is performed based on the second setting.

8. A control method by a liquid supply system supplying a liquid to a printer tank, the printer tank being a tank provided in a printer, the liquid supply system including a tube and a liquid delivery mechanism, the tube connecting the printer tank and a server tank configured to store the liquid, the liquid delivery mechanism being provided in the tube, the liquid delivery mechanism being configured to perform a supply operation of supplying the liquid from the server tank to the printer tank via the tube, and a return operation of returning the liquid from the printer tank to the server tank via the tube, the control method comprising:

circulation processing of causing the liquid delivery mechanism to perform the supply operation and the return operation based on a circulation setting relating to a unit increase amount, the circulation processing including first circulation processing and second circulation processing being subsequent to the first circulation processing, the unit increase amount being an amount by which a remaining amount of the liquid in the server tank or the printer tank increases as a result of the second circulation processing, per unit time from an end of the first circulation processing to an end of the second circulation processing; and setting processing of setting the circulation setting to a first setting, and changing the circulation setting from the first setting to a second setting based on information relating to consumption of the liquid inside the server tank or the printer tank in a predetermined time period, a specific tank being a tank, of the server tank and the printer tank, in which the remaining amount of the liquid increases when the circulation processing is performed based on the first setting, the unit increase amount of the specific tank in the second setting being less than the unit increase amount of the specific tank in the first setting.

9. A non-transitory computer-readable medium storing computer-readable instructions executed by a computer of a liquid supply system supplying a liquid to a printer tank, the printer tank being a tank provided in a printer, the liquid supply system including a tube and a liquid delivery mechanism, the tube connecting the printer tank and a server tank configured to store the liquid, the liquid delivery mechanism being provided in the tube, the liquid delivery mechanism being configured to perform a supply operation of supplying the liquid from the server tank to the printer tank via the tube, and a return operation of returning the liquid from the printer tank to the server tank via the tube, the instructions, when executed by the computer, causing the computer to perform processes comprising:

circulation processing of causing the liquid delivery mechanism to perform the supply operation and the return operation based on a circulation setting relating to a unit increase amount, the circulation processing including first circulation processing and second circulation processing being subsequent to the first circulation processing, the unit increase amount being an amount by which a remaining amount of the liquid in the server tank or the printer tank increases as a result of the second circulation processing, per unit time from an end of the first circulation processing to an end of the second circulation processing; and setting processing of setting the circulation setting to a first setting, and changing the circulation setting from the first setting to a second setting based on information relating to consumption of the liquid inside the server tank or the printer tank in a predetermined time period, a specific tank being a tank, of the server tank and the printer tank, in which the remaining amount of the liquid increases when the circulation processing is performed based on the first setting, the unit increase amount of the specific tank in the second setting being less than the unit increase amount of the specific tank in the first setting.

10. A liquid supply device supplying a liquid to a printer tank, the printer tank being a tank provided in a printer, the liquid supply device comprising:

a tube connecting the printer tank and a server tank configured to store the liquid;

a liquid delivery mechanism provided in the tube, and being configured to perform a supply operation of supplying the liquid from the server tank to the printer tank via the tube, and a return operation of returning the liquid from the printer tank to the server tank via the tube;

a processor; and a memory storing computer-readable instructions that, when executed by the processor, cause the processor to perform processes comprising:

circulation processing of causing the liquid delivery mechanism to perform the supply operation and the return operation based on a circulation setting relating to a unit increase amount, the circulation processing including first circulation processing and second circulation processing being subsequent to the first circulation processing, the unit increase amount being an amount by which a remaining amount of the liquid in the server tank or the printer tank increases as a result of the second circulation processing, per unit time from an end of the first circulation processing to an end of the second circulation processing; and setting processing of setting the circulation setting to a first setting, and changing the circulation setting from the first setting to a second setting based on information relating to consumption of the liquid inside the server tank or the printer tank in a predetermined time period, a specific tank being a tank, of the server tank and the printer tank, in which the remaining amount of the liquid increases when the circulation processing is performed based on the first setting, the unit increase amount of the specific tank in the second setting being less than the unit increase amount of the specific tank in the first setting.

* * * * *